United States Patent [19]
Tavor

[11] Patent Number: 6,029,691
[45] Date of Patent: Feb. 29, 2000

[54] IN-LINE CONTROL VALVES

[76] Inventor: Elhanan Tavor, 14 Vered St., Carmiel, Israel, 20100

[21] Appl. No.: 09/051,712

[22] PCT Filed: Sep. 12, 1996

[86] PCT No.: PCT/IL96/00109

§ 371 Date: Jul. 8, 1998

§ 102(e) Date: Jul. 8, 1998

[87] PCT Pub. No.: WO97/14898

PCT Pub. Date: Apr. 24, 1997

[30] Foreign Application Priority Data

Oct. 19, 1995 [IL] Israel ......................................... 115700
Oct. 19, 1995 [IL] Israel ......................................... 115701

[51] Int. Cl.[7] .................................................... F16K 1/12
[52] U.S. Cl. ........................................... 137/219; 251/282
[58] Field of Search ............................. 137/219; 251/282

[56] References Cited

U.S. PATENT DOCUMENTS

| | | |
|---|---|---|
| 3,356,103 | 12/1967 | Biello et al. ........................ 137/219 X |
| 3,945,393 | 3/1976 | Teatini . |
| 4,681,130 | 7/1987 | Tabor . |

FOREIGN PATENT DOCUMENTS

| | | |
|---|---|---|
| 75895 | 7/1985 | Israel . |
| WO 95/23309 | 8/1995 | WIPO . |

*Primary Examiner*—Gerald A. Michalsky
*Attorney, Agent, or Firm*—Pillsbury Madison & Sutro, LLP

[57] ABSTRACT

In-line control valve constructions are described which include a piston-type valve assembly and a plurality of control chambers (C1,C2,C3,C4) controlled via one or more controls ports (CP1, CP2) to provide a normally-open valve may be closed by controlling the fluid pressure applied to the control port (CP1, CP2), or a normally-closed valve which may be opened by controlling the fluid pressure applied to the control port (CP1,CP2). Also described are valves which have a balanced construction and which therefore include relatively small actuators for opening and closing the valve.

28 Claims, 20 Drawing Sheets

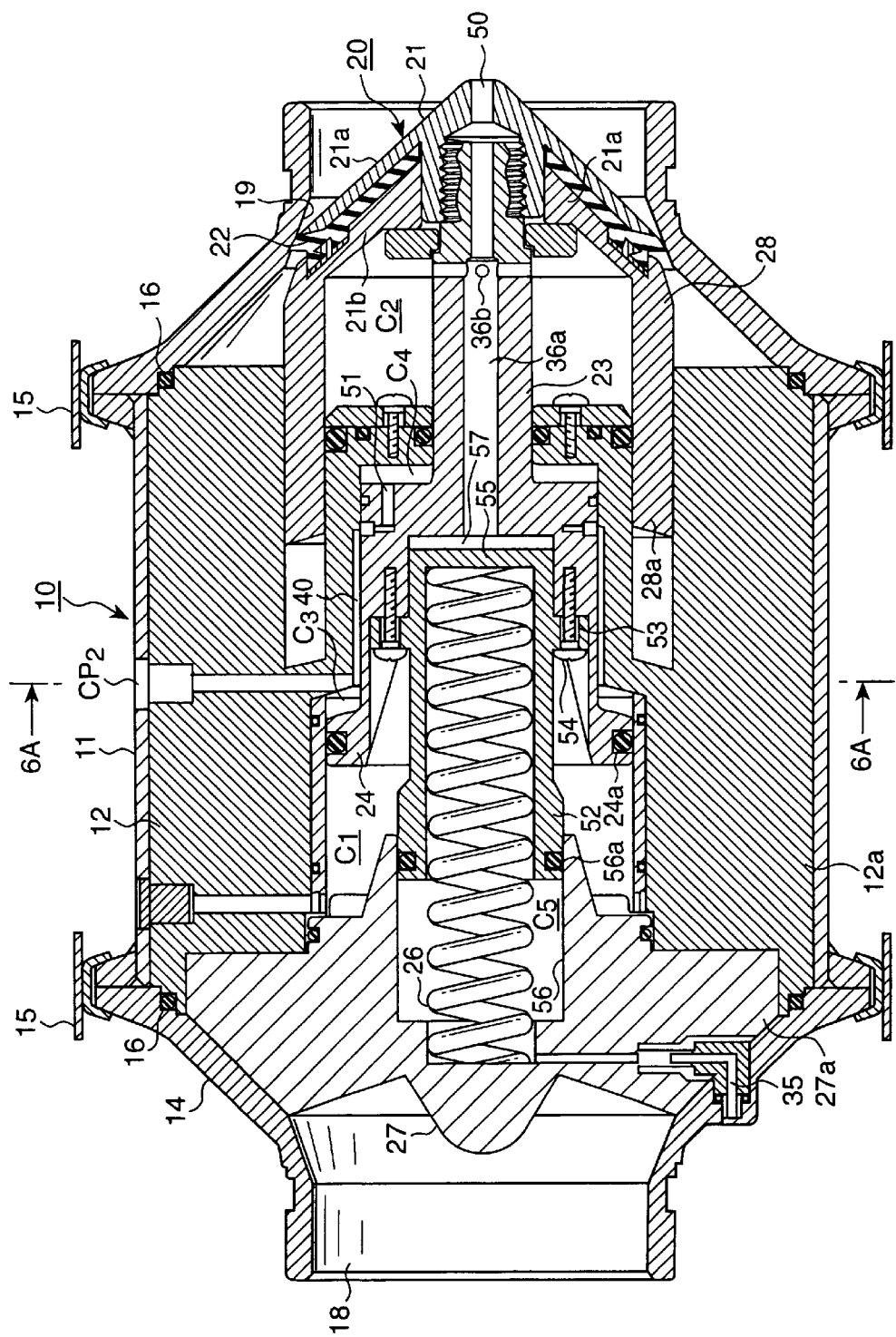

IN-LINE CONTROL VALVES

The present invention relates to valves for controlling the flow of a fluid (liquids or gasses) through a pipe. The invention is particularly useful with respect to the type of in-line control valve described in our prior U.S. Pat. No. 4,681,130, and is therefore described below with respect to that type of control valve.

The above-cited patent discloses an in-line control valve which is normally open and which is actuated to a closed position by applying a fluid pressure, e.g., the inlet pressure, to two control chambers within the valve both acting together to produce a combined closing force substantially greater than the opening force produced by the inlet pressure applied to the upstream face of the valve member, thereby better assuring fast and safe closure of the valve against the inlet pressure.

An object of the present invention is to provide in-line control valves which may be of similar construction to that of the above-cited patent but which include a number of improvements and variations enabling valves to be constructed for a wide variety of different applications.

According to one aspect of the present invention, there is provided an in-line control valve comprising: a housing having an inlet port, an outlet port downstream of the inlet port, and a valve seat between the two ports; and a valve assembly within the housing; the valve assembly including: a valve member movable towards and away from the valve seat and having an upstream face facing the valve seat and a downstream face facing the outlet port; a valve stem fixed to the valve member and extending downstream thereof; a piston head carried by the valve stem at the downstream end thereof and having a downstream face defining a first control chamber with a first surface of the housing; a cylindrical skirt fixed to and extending downstream of the valve member and enclosing the valve stem but terminating short of the piston head to define a second control chamber with the valve member, the valve stem and a second surface of the housing; a fluid flow passageway through the housing to permit fluid flow therethrough in the open condition of the valve member, a pressure-control passageway through the valve stem establishing communication between the first and second control chambers such that the fluid pressure in the first chamber acts on the downstream face of the piston head tending to move it and the valve member towards the valve seat, and the fluid pressure in the second chamber acts on the upstream face of the valve member and tends to move it and the valve member also towards the valve seat; the upstream face of the piston head and a third surface of the housing defining a third control chamber such that the fluid pressure therein acts on the upstream face of the piston head tending to move it and the valve member towards the open position of the valve member away from the valve seat; and a control port communicating with the third control chamber for applying fluid therein to move the valve member towards its open position away from the valve seat.

According to another aspect of the invention, there is provided a control valve comprising: a housing having an inlet port, an outlet port downstream of the inlet port, and a valve seat between the two ports; and a valve assembly movable within the housing; the valve assembly including a valve member movable towards and away from the valve seat; the valve member having an upstream face facing the valve seat and a downstream face facing the outlet port; the valve seat being of conical configuration increasing in diameter in the downstream direction; the valve member carrying an annular resilient seal engageable with the conical valve seat in the closed position of the valve member; the valve member including an upstream conical valve cover and a downstream valve body of complementary conical configuration, the annular resilient seal including a conical skirt clamped between the conical valve cover and valve body, the annular resilient seal further including a thickened outer periphery having an inner section received within an annular recess formed in the outer periphery of the valve body, and an outer section having an annular face exposed by the conical valve cover for sealing engagement with the conical valve seat.

According to a still further aspect of the invention, there is provided an in-line control valve for controlling the flow of a pressurized fluid, comprising: a housing having an inlet port, an outlet port downstream of the inlet port, and a valve seat between the two ports; a valve member movable to open and close positions with respect to the valve seat and having an upstream face facing the valve seat, and a downstream face facing the outlet port: the housing including surfaces defining, with downstream surfaces of the valve member, control chamber means downstream of the valve member; a passageway through the valve member from its upstream face through its downstream face and communicating with the control chamber means such that the inlet pressure of the fluid at the inlet port is applied to the control chamber means to produce a closing force tending to move the valve member to its closed position and opposed to the opening force, tending to move the valve member to its open position, produced by the inlet pressure applied to the upstream face of the valve member; and an actuator for actuating the valve member to its open and closed positions.

Further features of the invention will be apparent from the description below.

The invention is herein described, by way of example only, with reference to the accompanying drawings, wherein.

Figure 1:
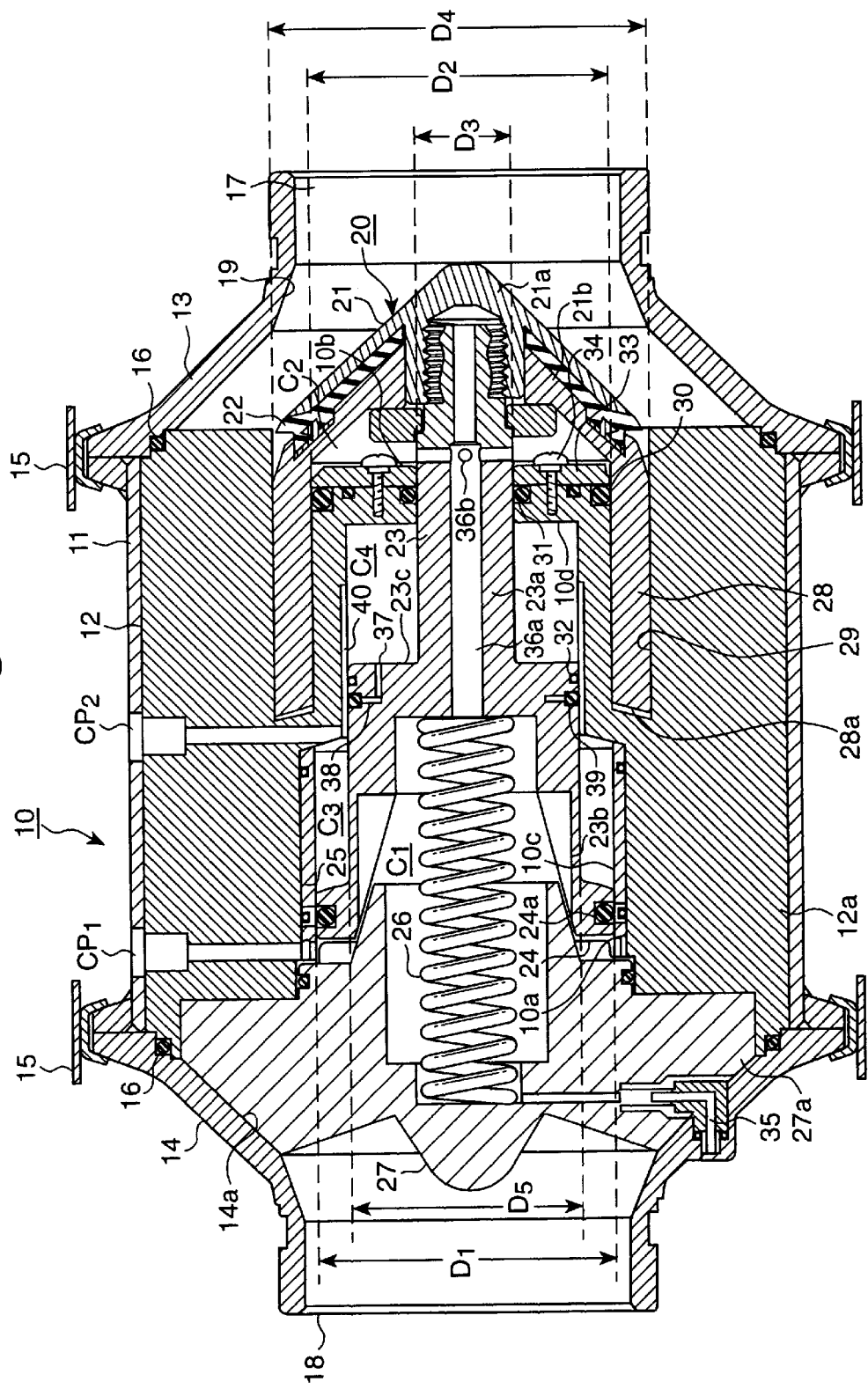
FIG. 1 is a longitudinal sectional view illustrating one form of normally-open control valve constructed in accordance with the present invention, the valve member being shown in its normally-open position which it assumes in the presence of a fluid inlet pressure.
Figure 5:
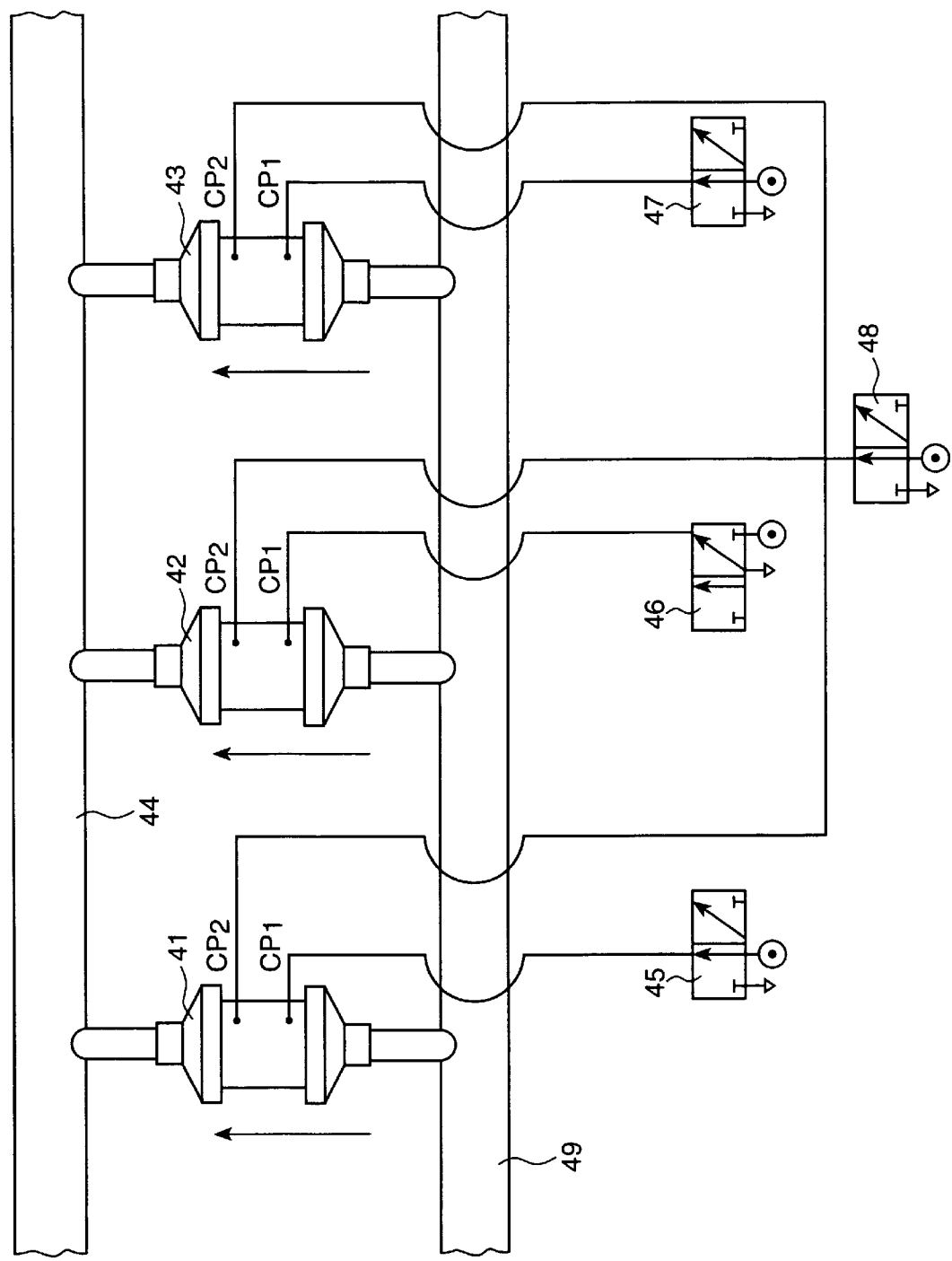
Figure 6A:
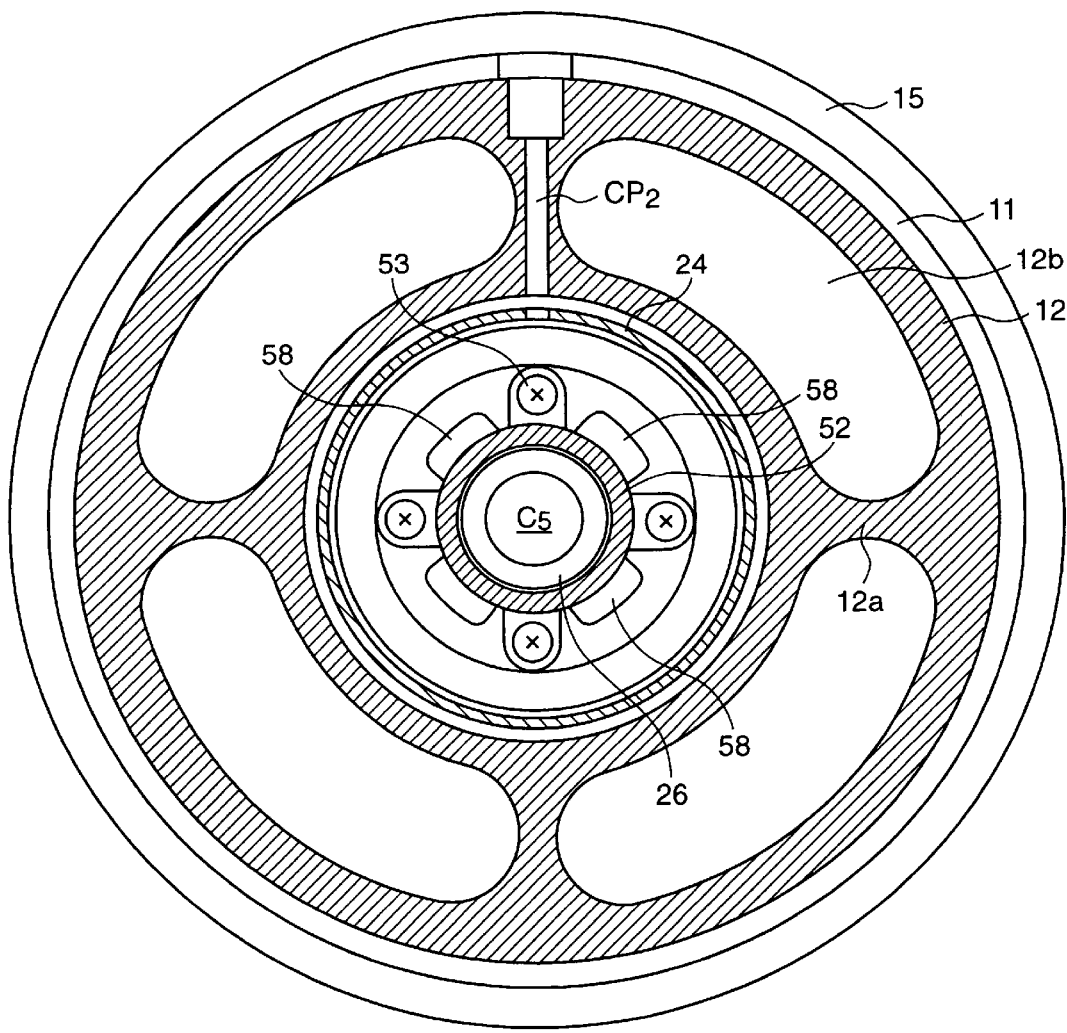
Figure 7:
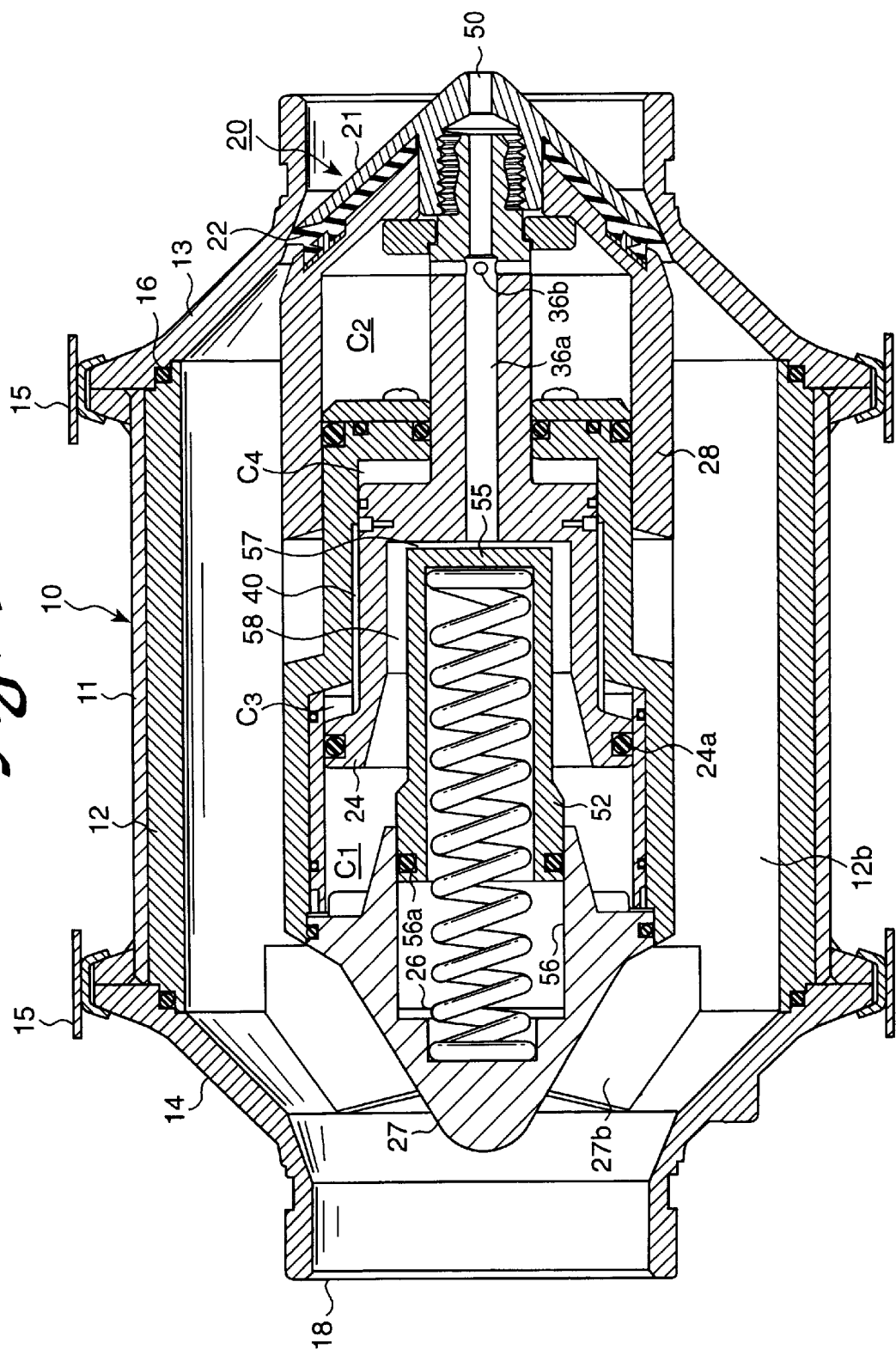
Figure 8:
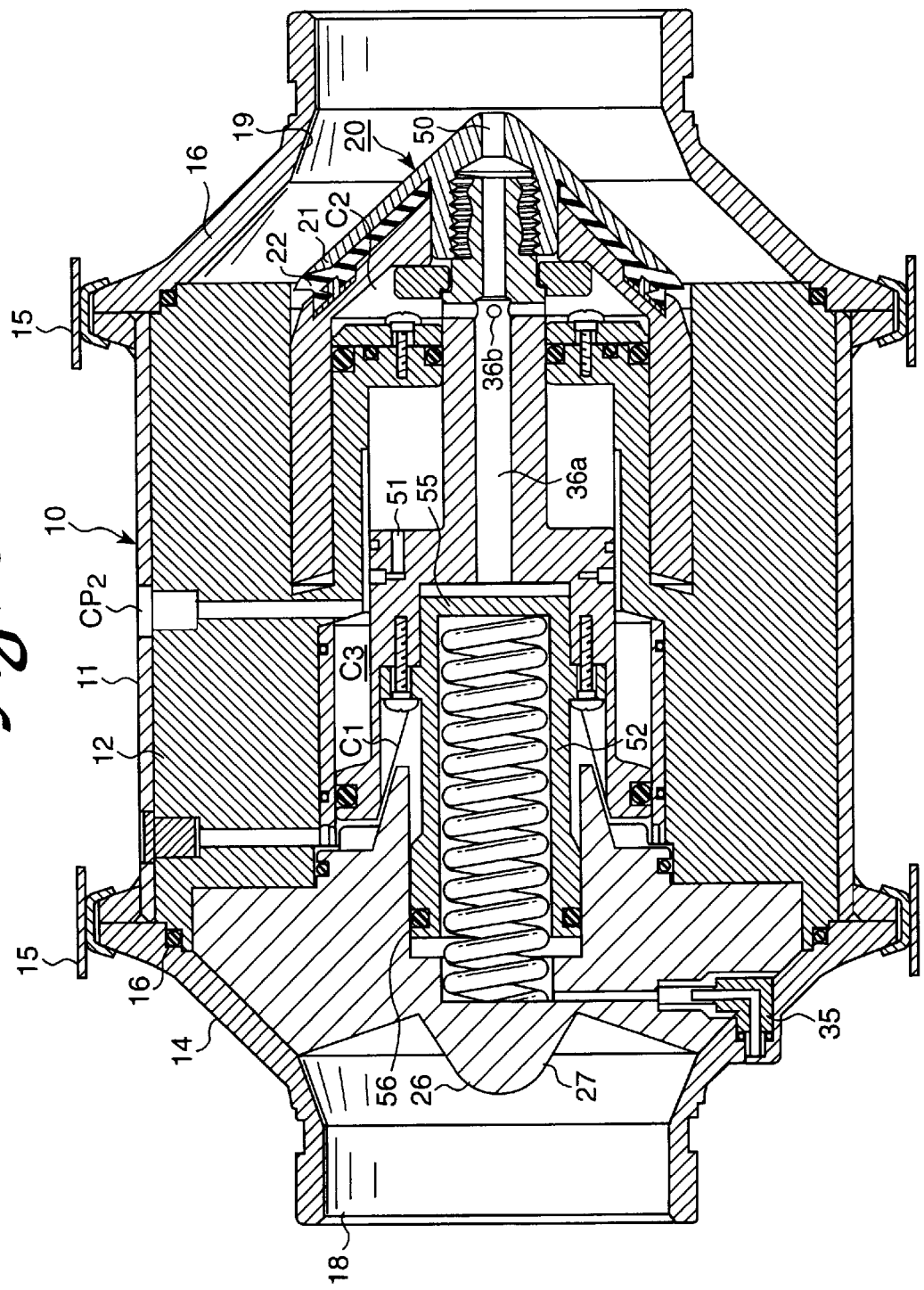
Figure 9:
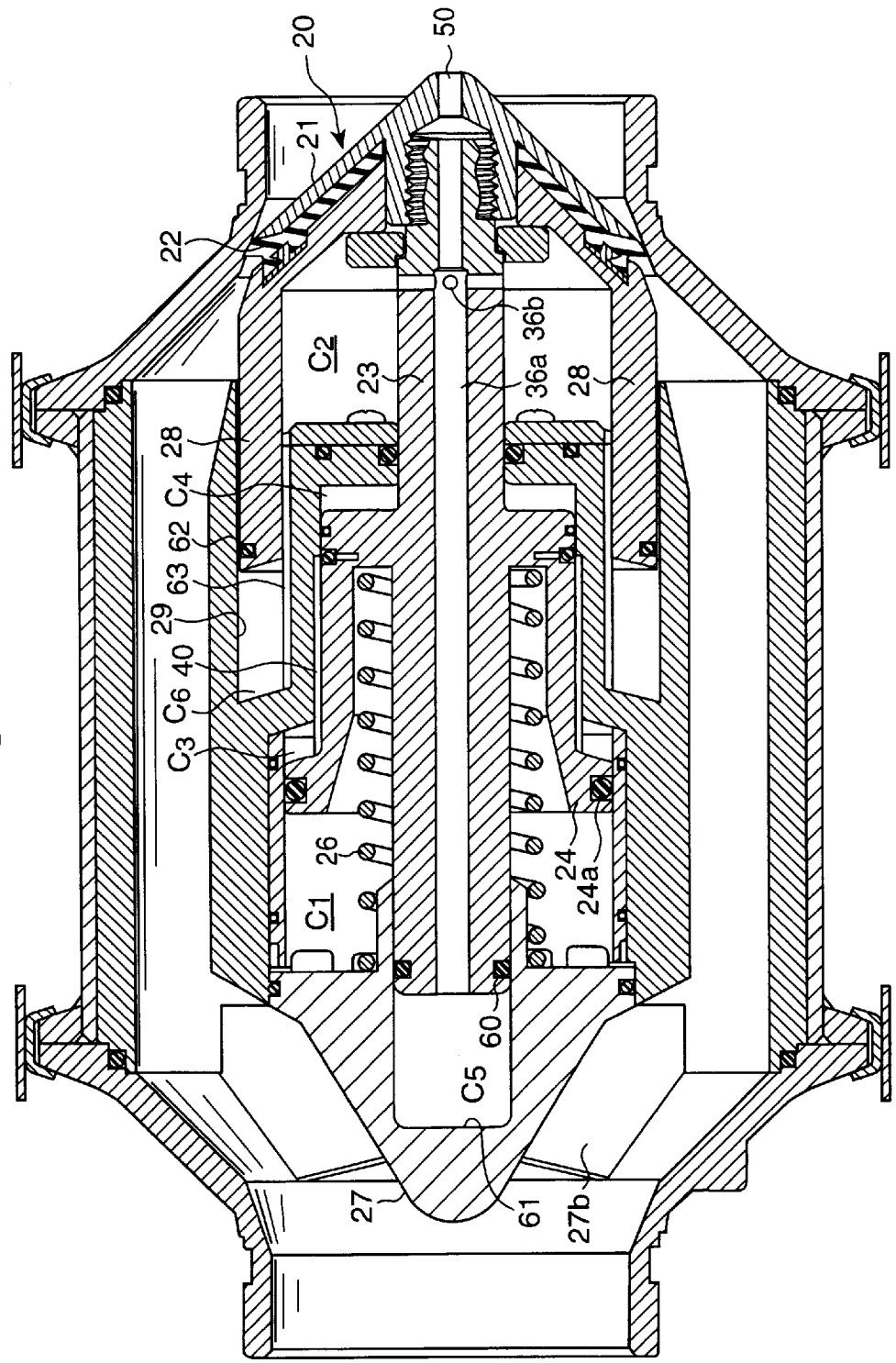
Figure 10:
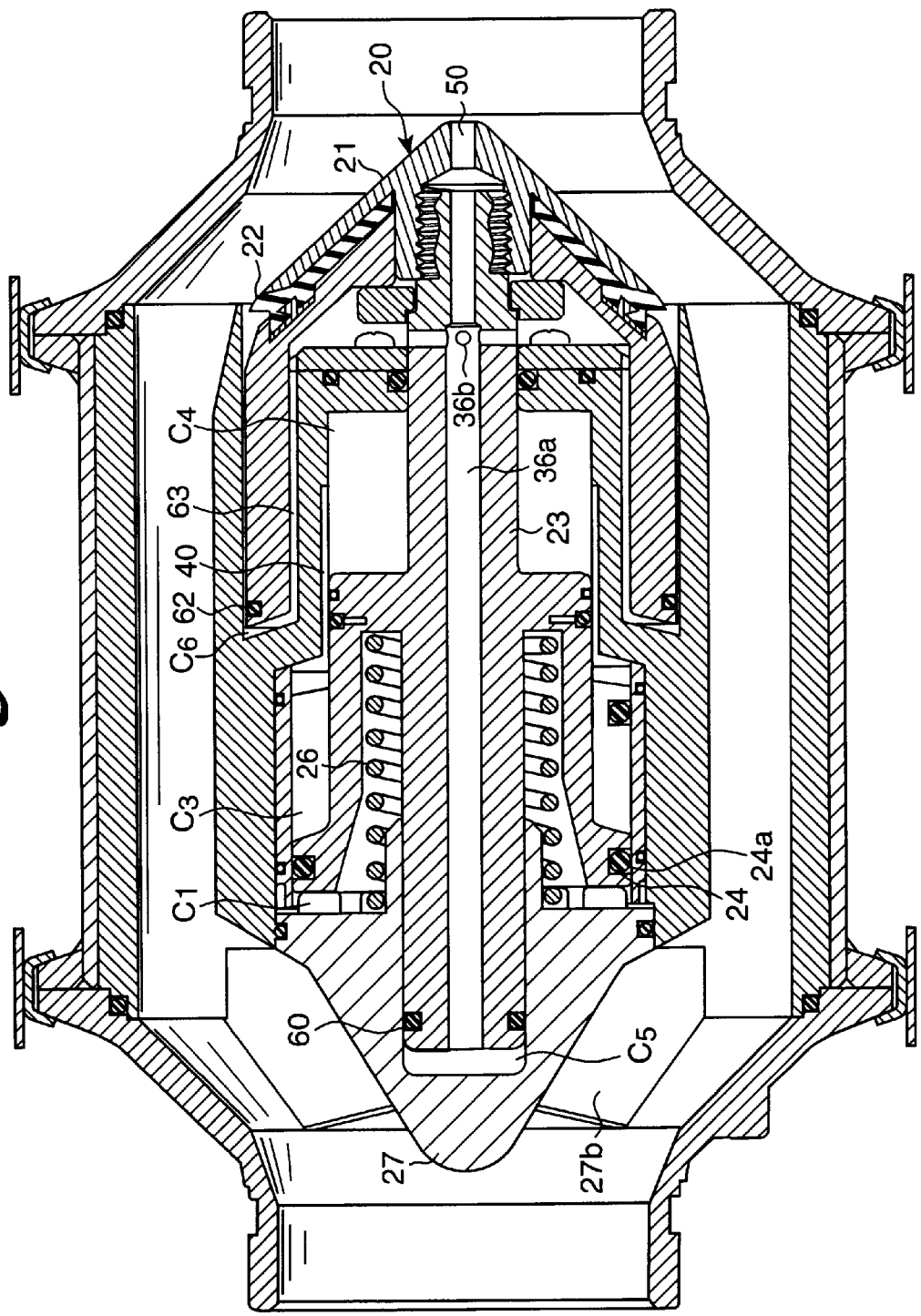
Figure 11:
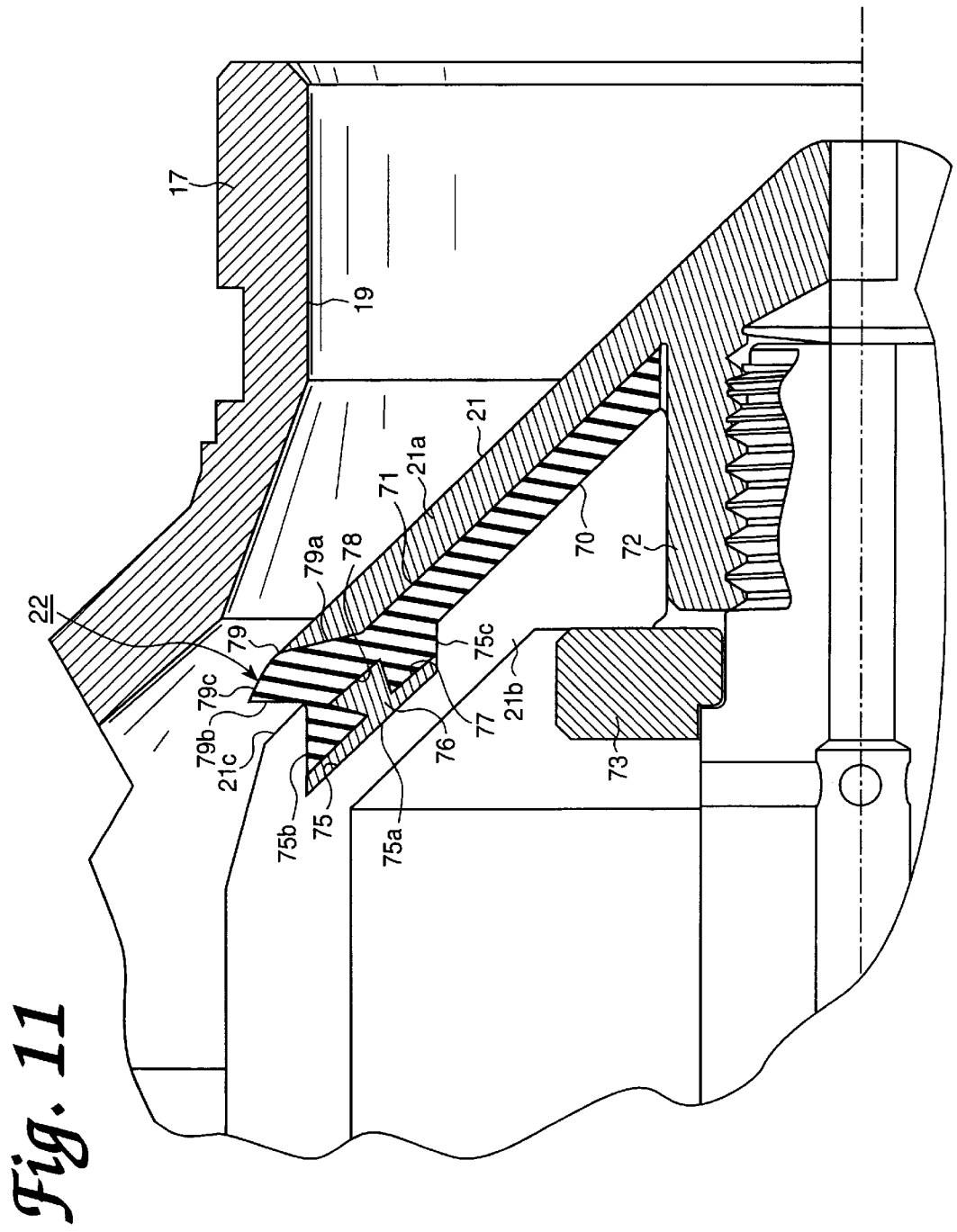
Figure 11A:
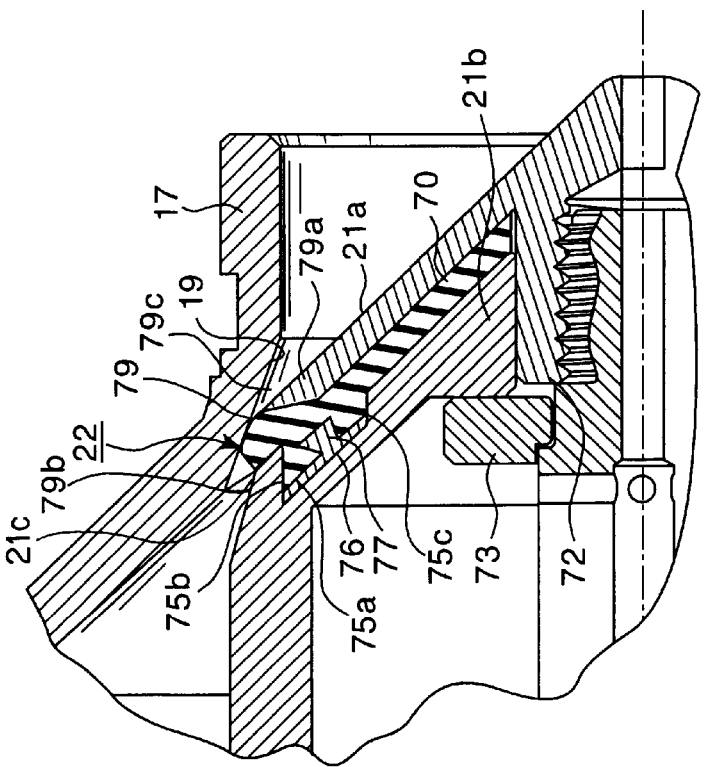
Figure 11B:
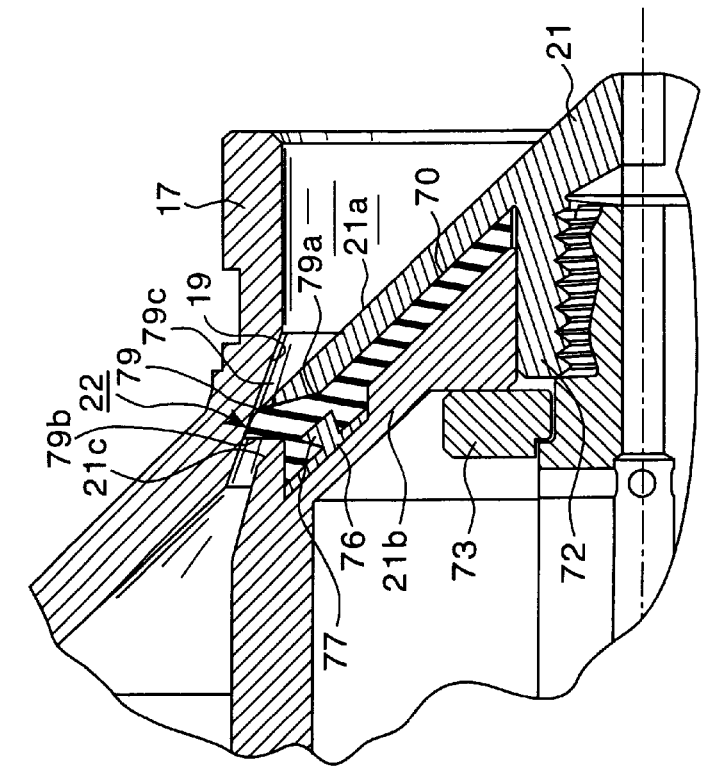
Figure 11C:
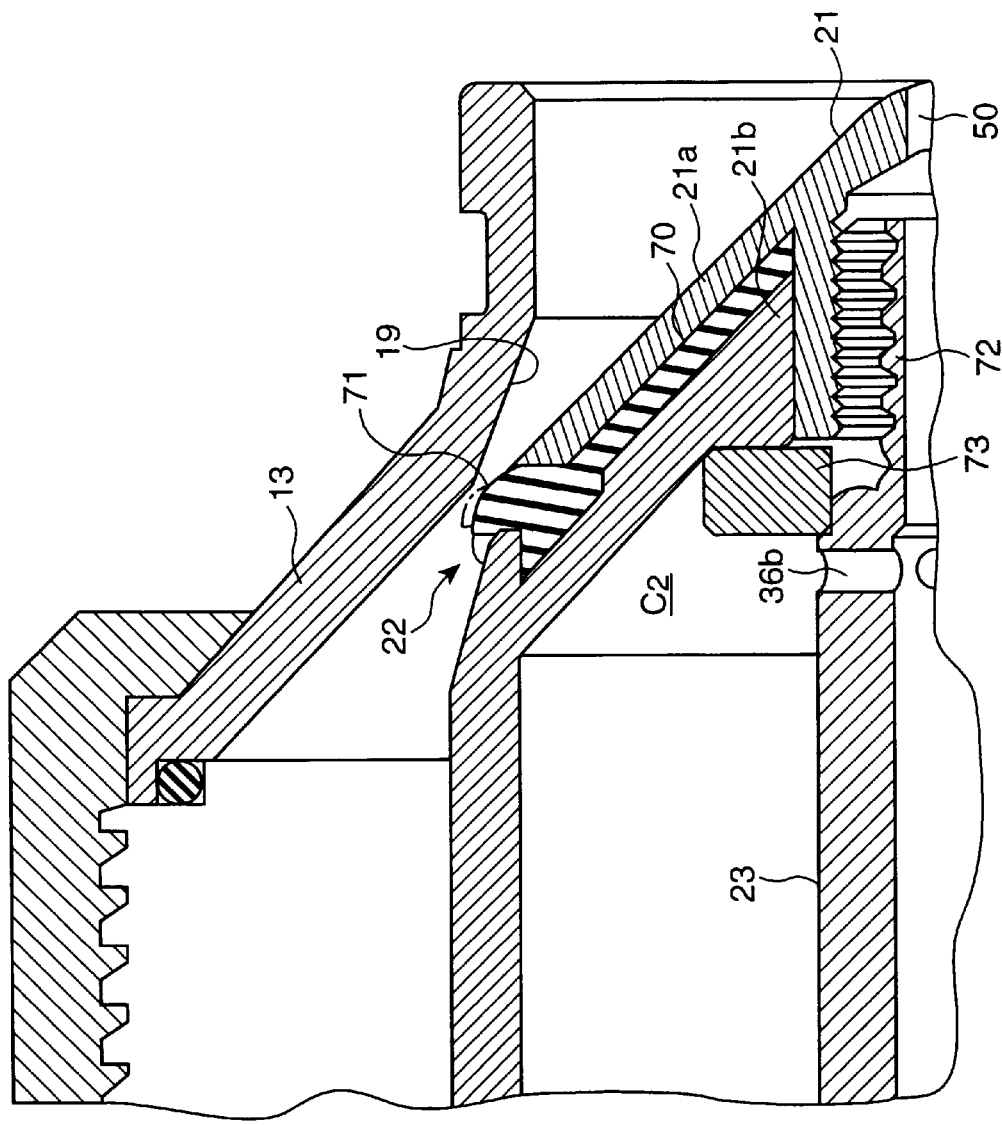
Figure 12:
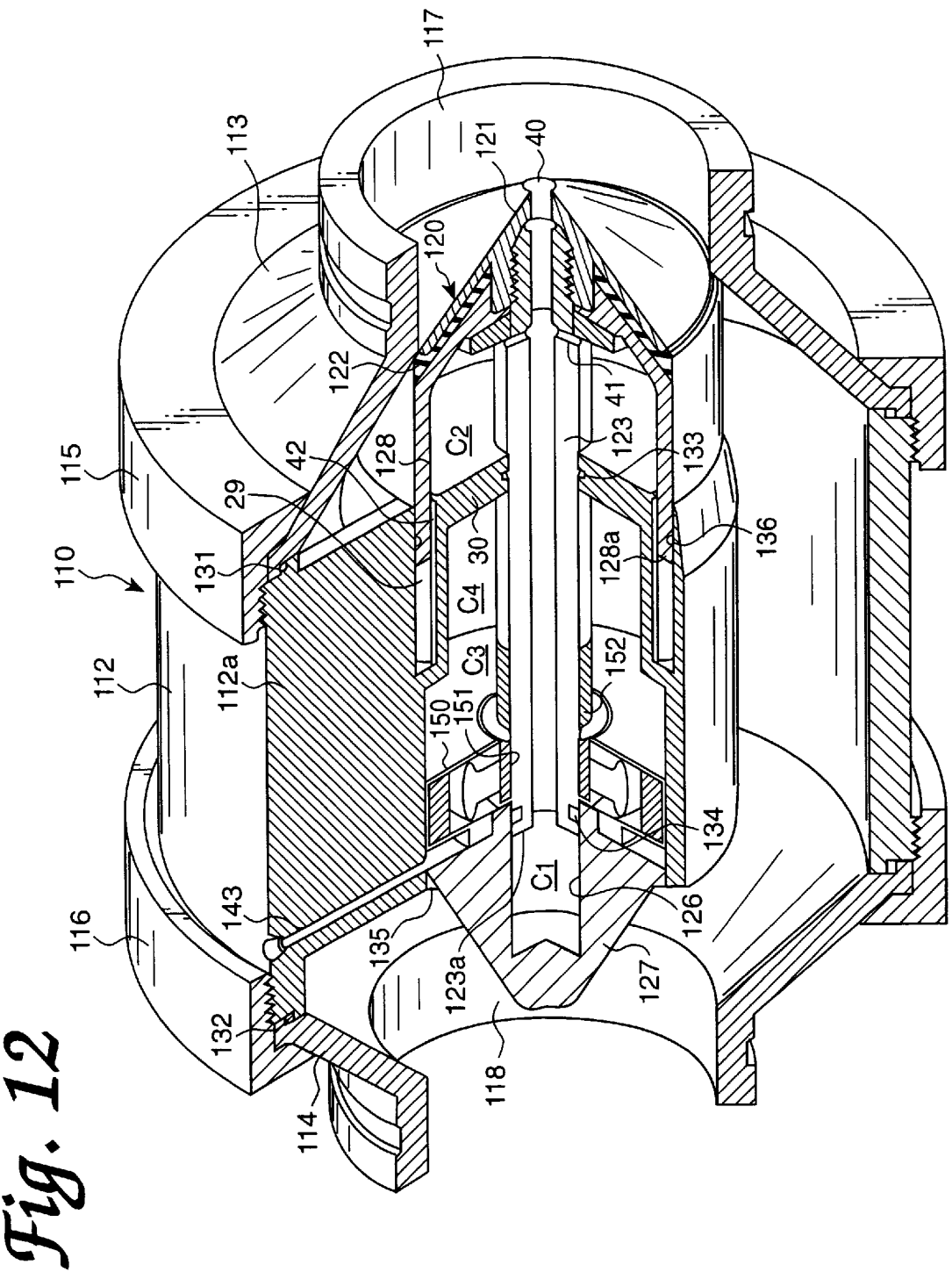
Figure 13:
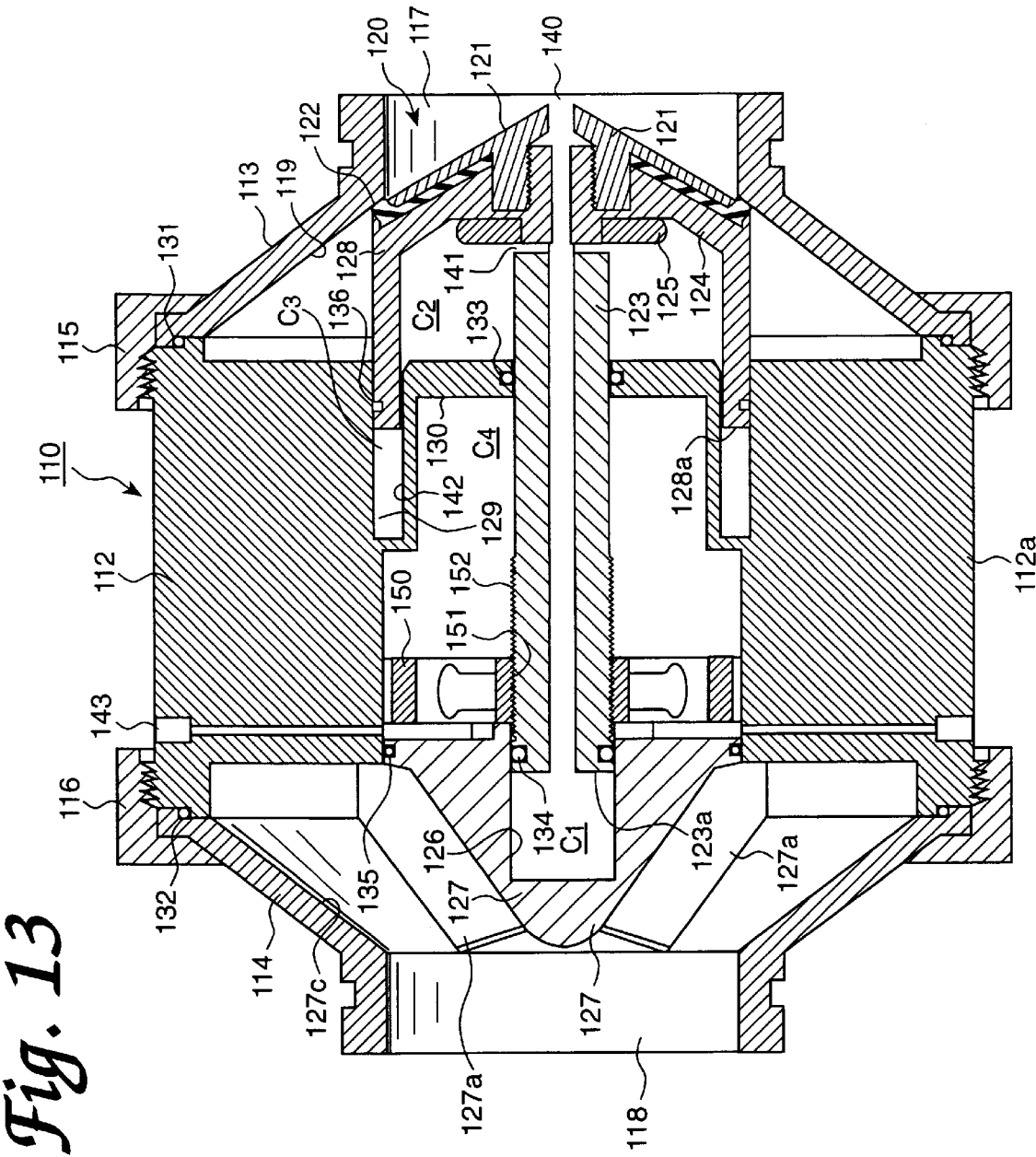
Figure 14:
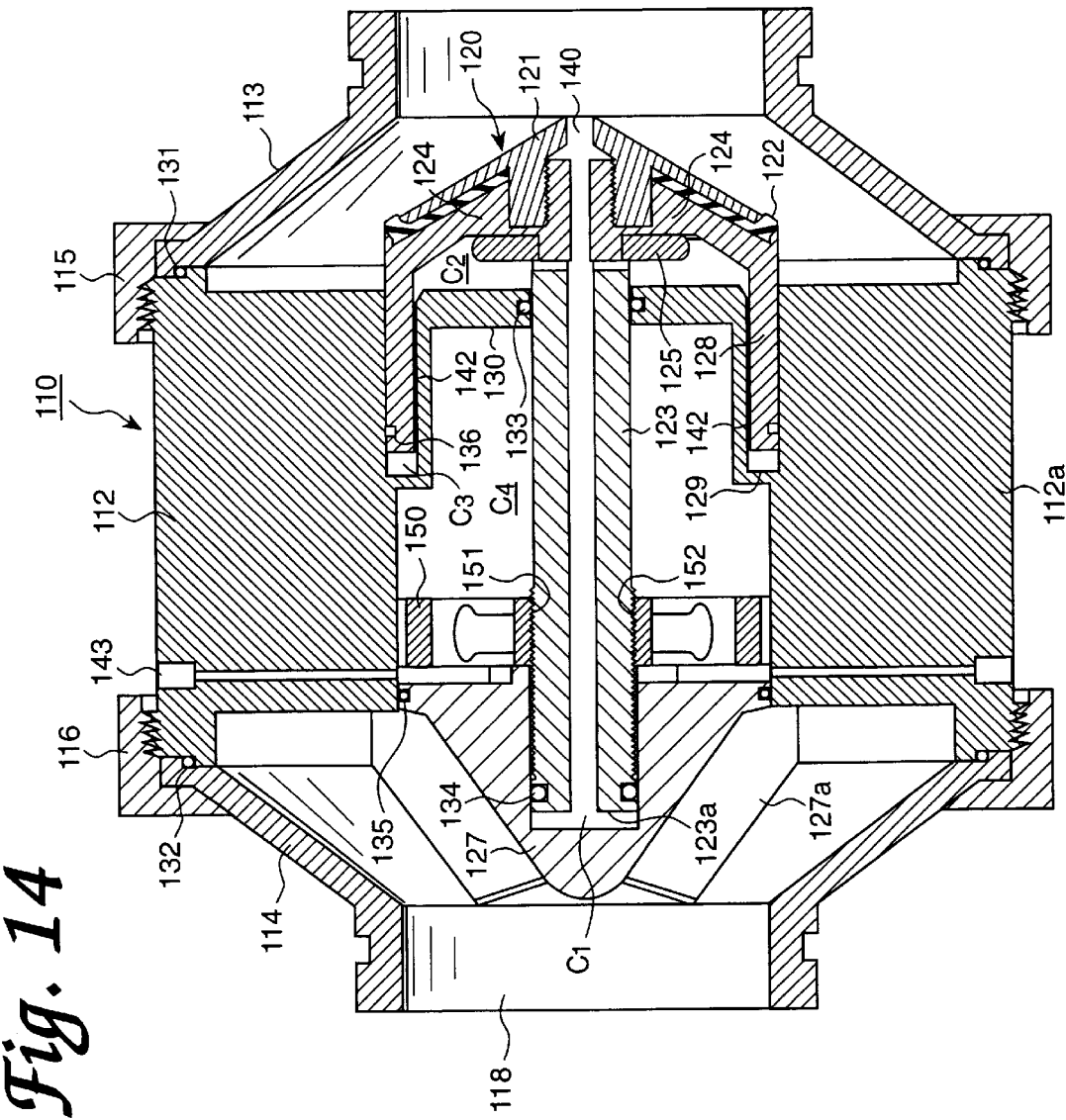
Figure 15:
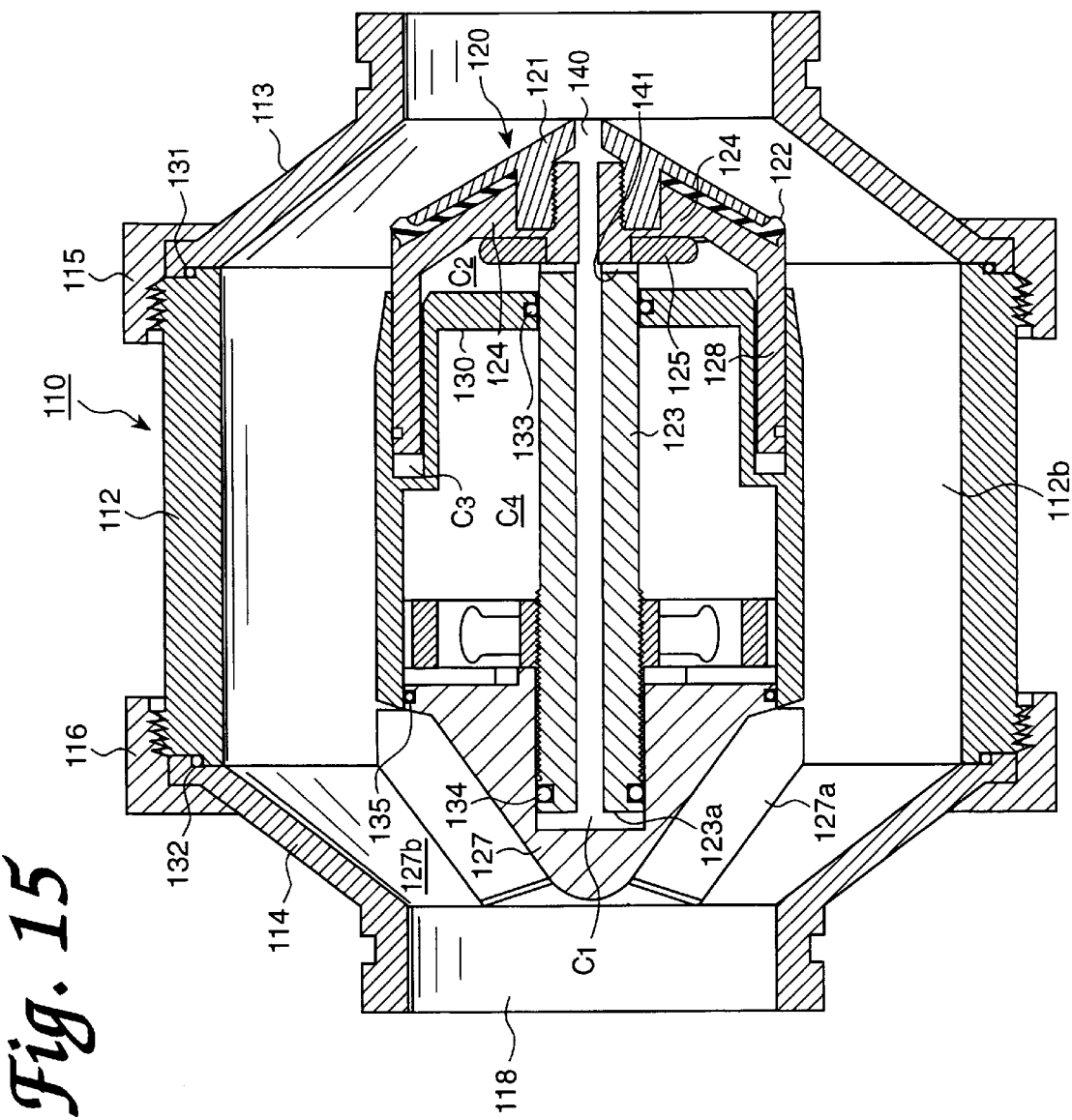
Figure 16:
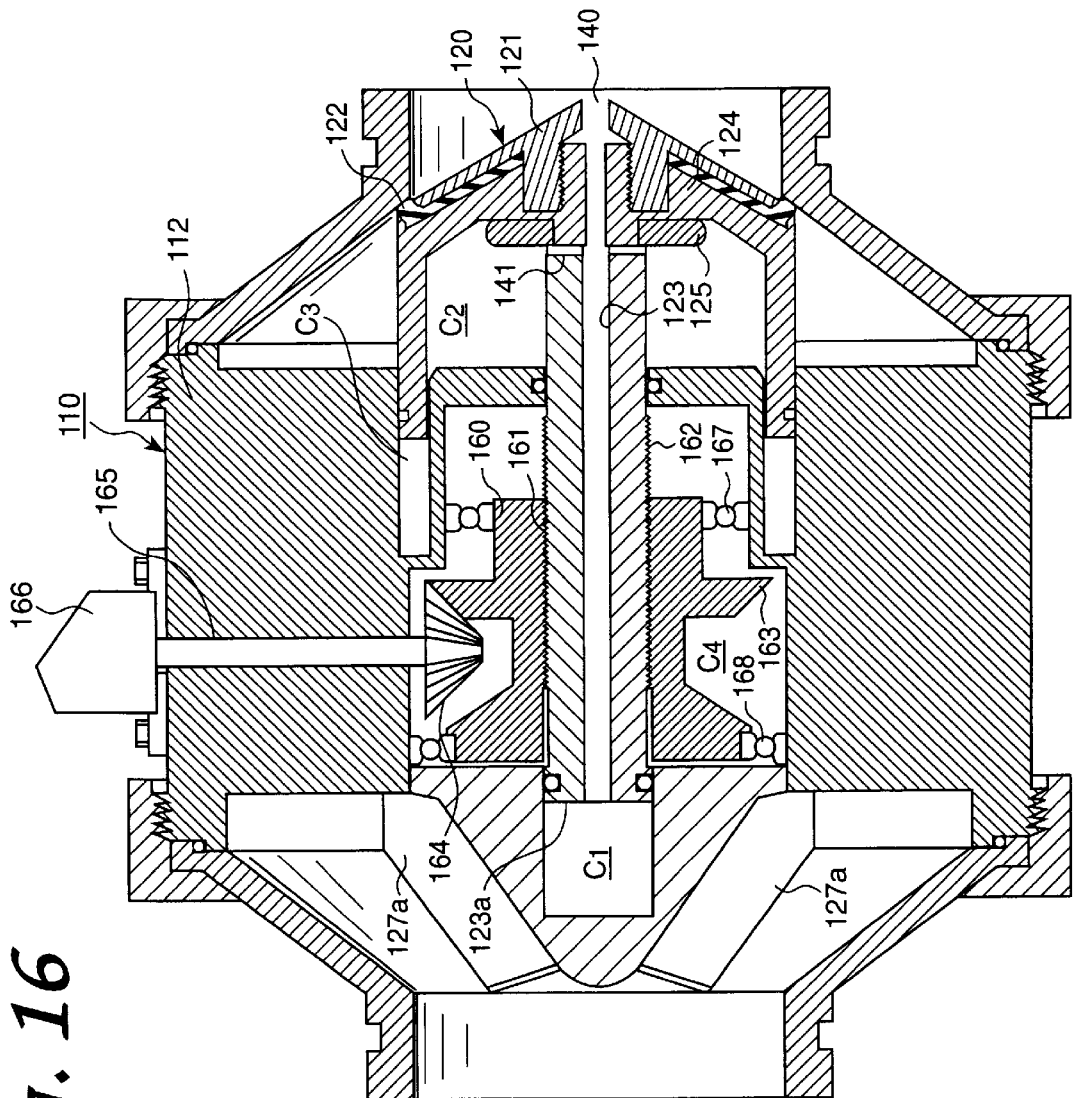
Figure 17:
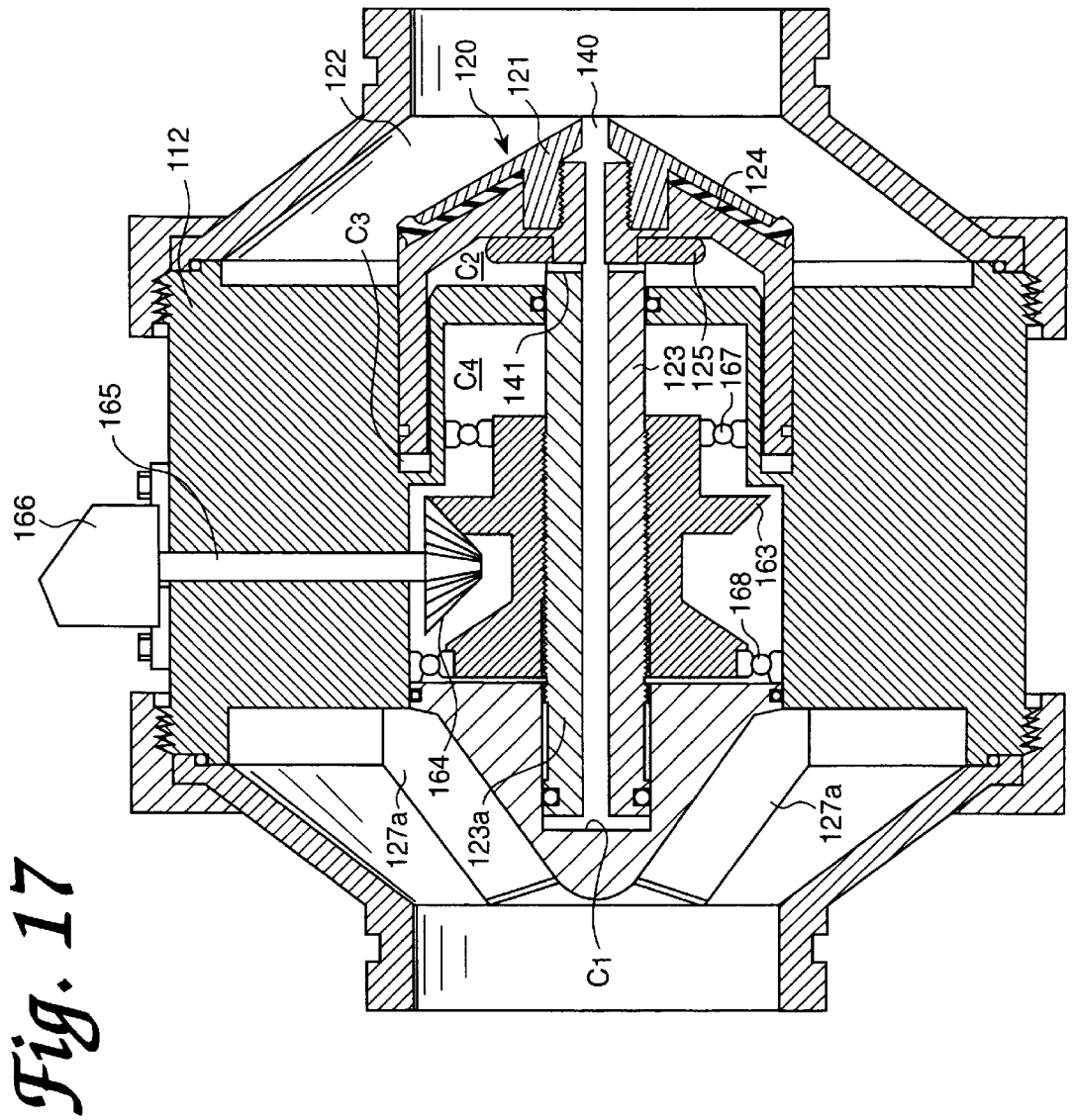

FIG. 5 diagrammatically illustrates a battery of control valves according to FIG. 1 and one manner in which the valves may be controlled;

FIG. 6 is a longitudinal sectional view illustrating one form of normally-closed control valve constructed in accordance with the present invention;

FIG. 6a is a transverse-sectional view along line 6a—6a of FIG. 6, FIG. 7 is a similar view as FIG. 6 but along a section line rotated 45] to better show internal structure;

FIG. 8 illustrates the control valve of FIGS. 6 and 7 in its open condition;

FIG. 9 is a longitudinal sectional view illustrating another form of normally-closed control valve constructed in accordance with the present invention;

FIG. 10 illustrates the valve of FIG. 9 in its actuated open condition;

FIG. 11 is an enlarged fragmentary view more particularly illustrating the construction of the resilient seal in the valve assembly;

FIGS. 11a–11c illustrate various conditions of the resilient seal of FIG. 11;

FIG. 12 is a three-dimensional view, partly broken away to show internal structure, illustrating an internal- motor actuated control valve constructed in accordance with the invention;

FIG. 13 is a longitudinal sectional view of the control valve of FIG. 12 showing the valve in its closed condition;

FIG. 14 is a similar view as FIG. 13, but showing the valve in its open condition;

FIG. 15 is a longitudinal sectional view, similar to that of FIG. 14, but taken along a sectional line rotated 45] with respect to that of FIG. 14;

FIG. 16 is a longitudinal sectional view illustrating an external-motor actuated control valve constructed in accordance with the invention and showing the valve in its closed condition, and FIG. 17 is a view similar to that of FIG. 16 but showing the valve in its open condition.

The normally-open control valve illustrated in FIGS. 1–4 comprises a housing, generally designated 10, including an outer cylindrical section 11, preferably of metal, an inner cylindrical section 12, preferably of plastic, an inlet coupling duct 13 at the upstream end of the housing, and an outlet coupling duct 14 at the downstream end of the housing. The two coupling ducts 13, 14, also preferably of metal, are of conical configuration and are welded to the outer metal side wall 11. Flange assemblies 15 reinforce the welded junctures of the two coupling ducts 13, 14 to the outer cylindrical section 11, and seals 16 seal the inner cylindrical section 12 with respect to the coupling ducts 13, 14.

The inlet coupling duct 13 includes an inlet port 17 for inletting the fluid into the housing, and the outlet coupling duct 14 includes an outlet port 18 for outletting the fluid. The inlet coupling duct 13 is formed on its inner surface with a conical valve seat 19 cooperable with the valve assembly within the housing for controlling the flow of the fluid from the inlet port 17 to the outlet port 18.

The valve assembly within housing 10 is generally designated 20. It includes a hydrodynamically-shaped valve member 21, constituted of a conical valve cover 21a and valve body 21b, securing an annular resilient seal 22 around the outer periphery of the valve cover and movable towards and away from the conical valve seat 19. Valve member 21 is connected to an actuator which includes a valve stern 23 threadedly attached to valve member 21 and extending downstream thereof. The downstream end of valve stem 23 carries a piston head 24 having a sealing ring 24a movable within a cylinder 25, in the form of a cylindrical liner, within housing section 12.

Valve member 21 is urged to the valve-closed condition illustrated in FIG. 1 by a spring 26 between piston head 24 and a radial wall, defined by a rear cap 27, at the downstream end of housing 10 adjacent to its outlet port 18. Cap 27 is of a spider-configuration, being formed with a plurality of radially-extending ribs 27a (FIG. 1) to define between them a plurality of axially-extending passageways 27b (FIG. 3) to the outlet port 18. The outer surfaces of ribs 27a are shaped complementarily to the inner conical face 14a of the outlet coupling duct 14 such that spring 26 firmly presses cap 27 against coupling duct 14 while the passageways 27b between the ribs 27a define large axial passageways for the flow of the fluid to the outlet port 18.

Figure 3:
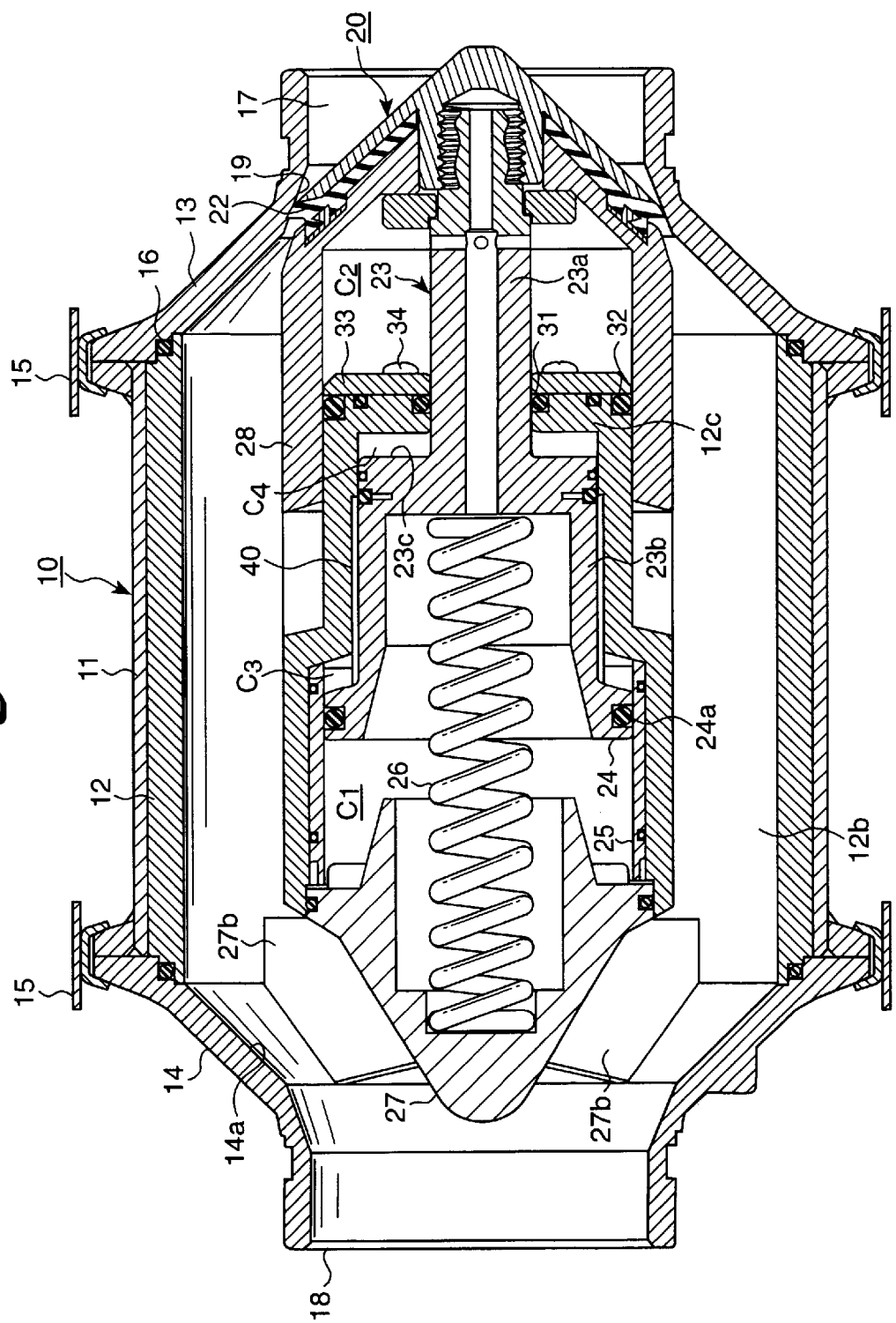
FIG. 3 is a similar cross-sectional view as FIG. 2 but along a section line rotated 45] to better show internal structure.
Figure 4:
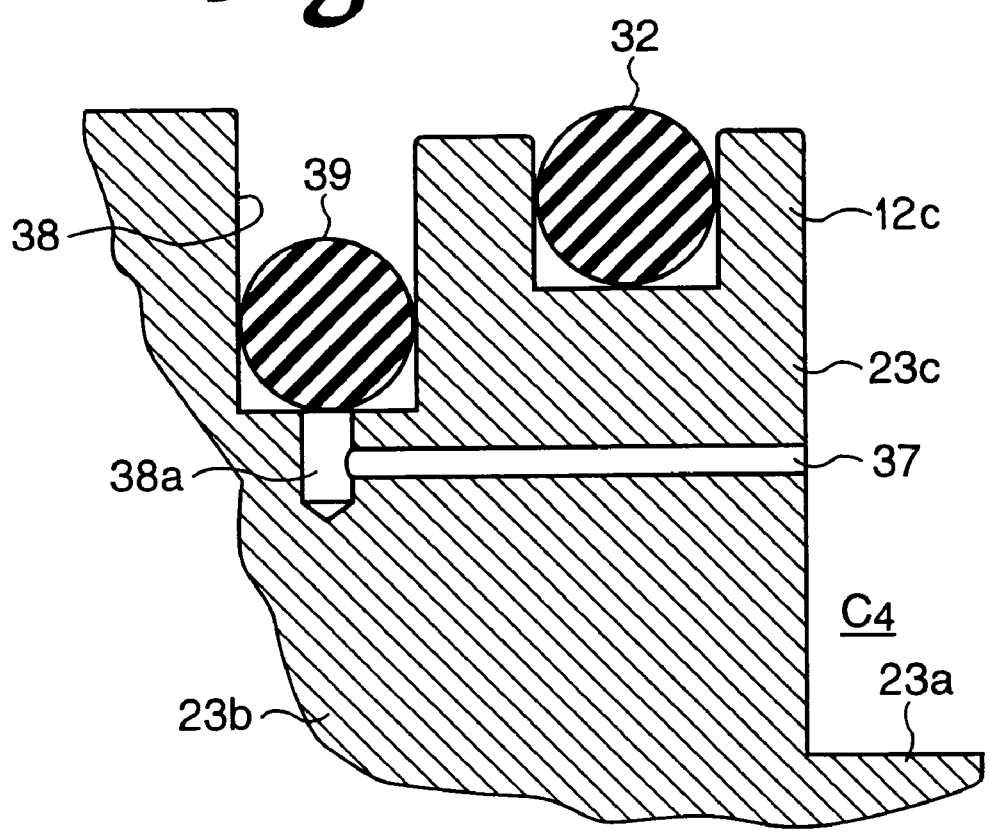
FIG. 4 is an enlarged fragmentary view illustrating the construction of the one-way vent of the cushioning chamber in the control valve of FIGS. 1–3.

Housing section 12 is similarly formed with a plurality of radially-extending ribs 12a (FIG. 1) aligned with ribs 27a of cap 27 and defining a plurality of axially-extending passageways 12b (FIG. 3) aligned, with passageways 27b of cap 27 for the flow of the fluid through the control valve when the valve assembly 20 is in its open position (FIG. 3).

Valve assembly 20 further includes a cylindrical skirt 28 integrally formed with body 21b of valve member 21 and extending downstream thereof to enclose the respective part of valve stem 23. Cylindrical skirt 28 is movable within a cylindrical recess 29 formed axially through ribs 12a of housing section 12. The inner surface of cylindrical skirt 28 is sealed with respect to the housing by a sealing ring 30, whereas the outer surface of the skirt is unsealed and permits the free flow of the fluid through the axial passageways 12b in housing section 12.

Valve stem 23 is formed with an upstream section 23a enclosed by skirt 28 of valve member 21, and a downstream section 23b adjacent to piston head 24. The downstream section 23b is of larger outer diameter than the upstream section 23a, to define an annular wall 23c between the two sections. The upstream section 23a is sealed with respect to the housing by a sealing ring 31, and the downstream section 23b is sealed with respect to the housing by a sealing ring 32. Sealing rings 30 and 31 are carried by a radially-extending wall 12c of housing section 12 and are retained in place by a retainer plate 33 secured thereto by fasteners 34.

It will be seen that the construction of the control valve, insofar as described above, defines several chambers with housing 10, particularly housing section 12, as follows:

(1) Chamber C1 is defined by the downstream face of piston head 24, surface 10a of housing cylinder 25, and the confronting face of cap 27. As will be described more particularly below, chamber C1 serves as a first control chamber, and produces a force tending to move valve member 21 from its normally-open position to a closed position when pressurized fluid is applied via a control port CP1 communicating with chamber C1 via a passageway in one of the housing ribs 12a. Chamber C1 includes a drain 35 to the atmosphere, but this drain is plugged so that it is not effective in the normally-open construction of FIGS. 1–3.

(2) Chamber C2 is defined by the downstream face of valve body 21b including the inner face of its cylindrical skirt 28, surface 10b (on retainer plate 33 of radial wall 12c) of housing section 12, and the outer surface of valve stem 23. Chamber C2 communicates with chamber C1 via an axial passageway 36a and a radial passageway 36b in valve stem 23. Chamber C2 thus also serves as a control chamber producing a force intensifying that produced in chamber C1 to move valve member 21 from its normally-open position to its closed position when a control pressure is applied via control port CP1.

(3) Chamber C3 is defined by the upstream face of piston head 24, the adjacent portions of valve stem 23, and surface 10c of housing cylinder 25. Chamber C3 communicates with a second control port CP2 via a passageway in one of the housing ribs 12a such that when valve member 21 is closed and pressurized fluid is applied to the control port CP2, valve member 21 is moved to its open position, as will be described more particularly below.

(4) Chamber C4 is defined by annular wall 23c of valve stem 23 and surface 10d on radial wall 12c of housing section 12. Chamber C4 serves as a cushioning chamber for cushioning the movement of valve member 21 to its final closing position in order to prevent sudden impacting of the valve member against the valve seat 19. Cushioning chamber C4 is sealed by sealing ring 32 on valve stem 23 and sealing ring 31 on radial wall 12c of the housing.

To vent the fluid from cushioning chamber C4, valve stem 23 is formed with a small-diameter vent, which includes an axial bore 37 communicating with an annular groove 38, at a location in piston stem 23 slightly downwardly of its sealing ring 32. As shown particularly in FIG. 4, annular groove 38 has an inner end 38*a* closed by a sealing ring 39. The vent so-produced is a one-way vent, permitting fluid flow only from cushioning chambers C4 in the direction of control port CP2.

Housing section 12 is further formed with a plurality of axially-extending slots 40 from control port CP2 but terminating short of radial wall 12*c*.

As will be described more particularly below, the construction is such that the cushioning chamber C4 is effective to retard or cushion the closing movement of the valve assembly 20 only at the final movement to its closed position in order to cushion the impact of valve member 21 against valve seat 19. The force produced in chamber C4 is also effective to intensify the final opening movement of the valve assembly.

Figure 2:
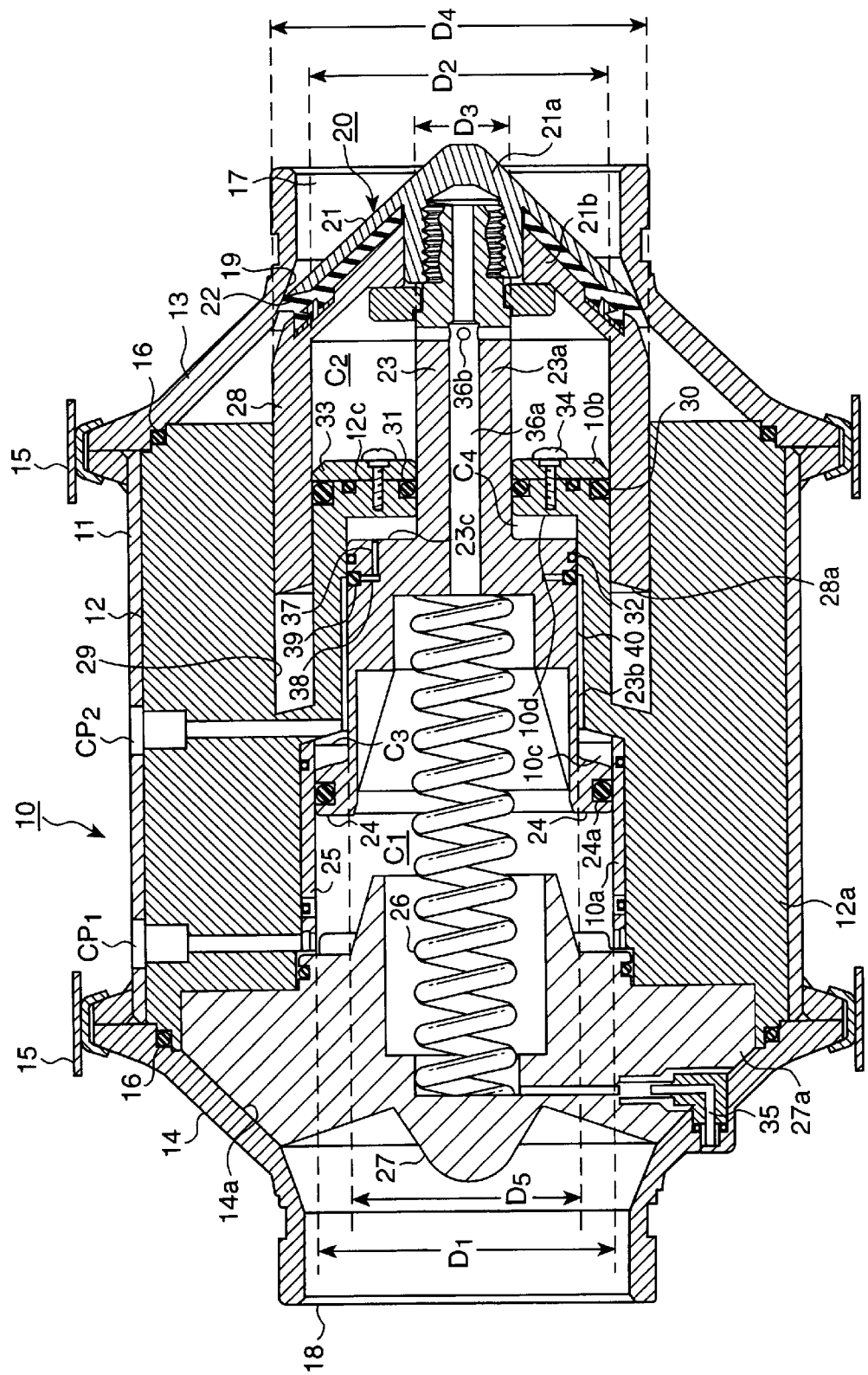
FIG. 2 is a view similar to that of FIG. 1 but illustrating the valve member in its closed position when a control pressure is applied to its control port.

The control valve illustrated, in FIGS. 1–4 operates as follows:

When the control valve is not connected to the line, or if connected, the line is not yet pressurized, the valve assembly will be in the closed position illustrated in FIG. 2 under the influence of spring 26. However, when the control valve is connected into the line and the line is pressurized, the inlet pressure is applied to the upstream face of valve member 21, thereby moving the valve assembly 20 to its open condition as illustrated in FIG. 1. Thus, the illustrated valve is in a normal open condition when the line is pressurized.

In the event of a failure of the inlet pressure, the force applied by the downstream pressure against surface 28*a* of the valve skirt 28, and also the force applied by spring 26, move valve assembly 20 to its closed condition (FIG. 1), thereby preventing backflow of fluid from the downstream pipe (not shown) via the outlet port 18, the inlet port 17, and the upstream pipe (not shown) connected to the inlet port.

When it is desired to close the valve, pressurized fluid is applied to control port CP1. Normally this is done by using a pilot valve (e.g., pilot valve 45 in FIG. 5) which connects control port CP1 to the inlet pressure. When this occurs, the inlet pressure is applied to control chamber C1 and also, via passageways 36*a* and 36*b* through valve stem 23, to control chamber C2.

The pressure within control chamber C1 produces a force against piston head 24 tending to move the valve assembly 20 towards its closed position (i.e., rightwardly in FIG. 3), the magnitude of this force being equal to the pressure within chamber C1 multiplied by the area of the outer diameter (D1) of piston head 24. The pressure within chamber C2 produces a force also acting in the direction to move valve assembly 20 towards its closed condition, i.e., boosting the force produced in chamber C1. The force produced in chamber C2, however, acts on the downstream face of valve member 21 and is of a magnitude corresponding to the inner diameter (D2) of the cylindrical skirt 28, less the outer diameter (D3) of valve stem section 23*a*.

When the valve assembly is in its open condition as illustrated in FIG. 1, the force acting to maintain the valve assembly in its open condition is equal to the inlet pressure multiplied by the area corresponding to the outer diameter (D4) of the cylindrical sleeve 28. This force acting to maintain the valve open is less than the sum of the forces produced by the pressure applied via control port CP1 to chambers C1 and C2, and by the downstream pressure applied to surface 28*a* of skirt 28, all acting to close the valve assembly. Therefore the valve assembly will start to move towards its closed condition.

During the initial movement of the valve assembly 20 towards its closed condition, chamber C4 communicates with the atmosphere via slots 40 and control port CP2 so that there is no buildup of pressure within chamber C4 which may retard the movement of the valve assembly towards its closed position. As the valve assembly approaches its closed position, wherein its seal 32 passes the end (right end) of slots 40, chamber C4 becomes a sealed chamber and therefore acts to cushion the closing movements of the valve assembly. The degree of cushioning, particularly when controlling the flow of a liquid (non-compressible) depends on the flow-rate allowed by venting bore 37 and annular groove 38.

Surface 28*a* of skirt 28 also acts to cushion the final closing movement of the valve assembly. As indicated earlier, the downstream pressure acts against skirt surface 28*a* in the direction tending to move the valve assembly to its closed position. As the valve assembly approaches its closed position, the differential pressure across the valve assembly increases, because of the higher flow resistance, thereby reducing the outlet pressure applied to skirt surface 28*a* as the valve assembly approaches its final closing position.

Reopening of the control valve may be effected by merely discontinuing the pressure to the control port CP1, in which case the inlet pressure applied to valve member 21 will move the valve assembly to the open position illustrated in FIG. 1.

The valve may also be reopened by discontinuing the pressure to control port CP1, and applying pressure to control port CP2. When this is done, the pressurized fluid within chamber C3 produces an opening force against the upstream face of piston head 24, which, together with the opening force produced by the inlet pressure against valve member 21, moves the valve assembly to its open condition as illustrated in FIG. 3.

Control port CP2 may be used alone to reopen the valve when the inlet pressure is low or when a vacuum is applied to the inlet. This control port may also be used, together with control port CP1, to regulate or dampen the movements of the valve assembly.

When the valve is closed and pressurized fluid is applied to control port CP2 to open the valve, sealing ring 39 prevents this pressurized fluid from passing through the venting bore 37 and annular groove 38 into the cushioning chamber C4. Thus, at the start of valve opening only the surface area of chamber C3 (defined by diameter D1 minus D5), together with the inlet pressure applied to the valve member 21, is effective to open the valve assembly. However, as soon as seal 32 of valve stem 23 passes the right end of slots 40, the pressure within chamber C3 is also applied to chamber C4, thereby increasing the opening force.

The presence of sealing ring 39 also permits a battery of valves to be selectively controlled in a simpler manner when the valves are all closed. Thus, as shown in FIG. 5, a battery of valves 41–43 connected in parallel to a common supply pipe 44 may be individually controlled by a separate pilot valve 45–47 each connected to the control port CP1 of its respective valve, and a common pilot valve 48 connected to the control port CP2 of all the valves. Thus, by applying pressure (e.g., the inlet pressure) to all the control ports CP2 via the common pilot valve 48, each of the valves 41–43 may be selectively closed, with respect to the downstream pipe 49, by discontinuing the application of pressurized fluid to the respective control port CP1 via the respective pilot valve 45–47.

FIGS. 6–8 illustrate a valve of generally the same construction as that described above with respect to FIGS. 1–4, but including several modifications to make it a normally-closed valve (when the inlet pressure is applied to it), rather than a normally-open valve as in the construction of FIGS. 1–4. An important advantage of a normally-closed valve is that it provides a fail-safe closure of the valve should there be a failure of the control pressure system. To facilitate understanding, those elements which are generally the same as in the valve of FIGS. 1–4 are identified by the same reference numerals.

One change in the construction is that the normally-closed valve of FIGS. 6–8 is formed with axial passageway 50 through its valve member 21 establishing communication with axial passageway 36a in the valve stem such that the inlet pressure is also applied to chamber C1 acting on the downstream face of the piston head 24, and to chamber C2 acting on the downstream face of the valve body 21b, both producing forces tending to move the valve assembly 20 to its closed condition as illustrated in FIGS. 6 and 7. Another change is that it does not require the control port CP1 through the housing section 12 communicating with chambers C1 and C2, and therefore control port CP1 is plugged, leaving a single control port CP2 communicating with chamber C3. A further change is that chamber C3 is in continuous communication with chamber C4 via slot 40 and a bore 51 of larger diameter than venting bore 37 in the FIGS. 1–3 construction, the sealing rings 32 and 39 of the FIGS. 1–3 construction also be omitted.

The FIGS. 6–8 construction includes a piston 52 formed with a plurality of radially-extending mounting tabs 53 spaced around its circumference for mounting to the downstream end of piston 24. Piston 52 is closed at its upstream end by end wall 55 Its downstream end is slidably received within a cylindrical cavity 56 in cap 27 and includes a sealing ring 56a to thereby define a further chamber C5. The latter chamber includes the spring 26 and is vented to the atmosphere via drain 35. Therefore, drain 35 in the FIGS. 6–8 construction is not plugged as it is in the FIGS. 1–3 construction.

End wall 55 of piston 52 is spaced from axial passageway 36a through the valve stem 23 so as not to block this axial passageway. This space 57 communicates with chamber C1 via the spaces 58 (FIGS. 6a, 7) between the mounting tabs 53. Thus, the inlet pressure is applied to chamber C1 via axial passageways 50 and 36a, and spaces 57 and 58. As in the FIGS. 1–3 construction, the pressure produced in chamber C1 is also applied to chamber C2, and the forces produced in both chambers tend to close the valve as opposed to the force produced by the inlet pressure against valve member 21 tending to open the valve. As distinguished from the construction in FIGS. 1–3, however, the closing force produced in chamber C1 is reduced by the outer cross-sectional area of piston 52 (since chamber C5 is vented to the atmosphere). The closing force is opposed by the opening force produced in chambers C3 and C4 when a control pressure is applied via control port CP2.

When the control valve illustrated in FIGS. 6–8 is connected to a water supply pipe, the inlet pressure is applied to the upstream face of valve member 21, thereby producing a force tending to open the valve. However, the inlet pressure is also applied via passageways 50 and 36a to chamber C1, and via passageway 36b to chamber C2, both producing forces tending to close the valve. The latter forces, together with the force produced by the downstream pressure (when the valve is not closed) against surface 28a, and the force produced by spring 26, are sufficiently greater than the opening force so that the valve is in a normally-closed condition as illustrated in FIG. 6.

When the valve of FIGS. 6–8 is to be opened, a control pressure (e.g., the inlet pressure) is applied to control port CP2. This control pressure is applied to both chambers C3 and C4 (the latter being via slots 40 and bore 51), producing an opening force, which, together with the opening force applied by the inlet pressure against the upstream face of valve member 21, is sufficient to move the valve assembly to its open condition as illustrated in FIG. 8. When the pressure is removed from control port CP2, the valve will return to its normally closed condition.

In all other respects, the control valve illustrated in FIGS. 6–8 is constructed and operates in substantially the same manner as described above.

FIGS. 9 and 10 illustrate a normally-closed valve construction similar to that of FIGS. 6–8. In this case, however, the axial passageways 50 through valve member 21 and its valve stem 23 extends via axial passageway 36a to chamber C5 between the downstream end of valve stem 23 and the rear cap 27. Whereas in the construction of FIGS. 6–8 chamber C5 is vented to the atmosphere, in the construction of FIGS. 9 and 10 chamber C5 is not so vented, but rather is sealed by a sealing ring 60 between the outer surface of the downstream end of valve stem 23 and the inner surface of cavity 61 in the rear cap 27. In this construction, therefore, drain 35 (FIG. 8) is plugged, but control port CP1 (e.g., FIG. 1) is vented to the atmosphere.

Also, the outer surface of valve skirt 28 carries a sealing ring 62, and the surface of housing section 12 formed with annular recess 29 for the valve skirt is formed with a plurality of axially-extending slots 63, thereby establishing communication between chambers C6 and C2.

It will be seen that in the construction of FIGS. 9 and 10, the inlet pressure applied to the upstream face of valve member 21 produces an opening force which is substantially balanced by the sum of the closing forces produced by the inlet pressure in chambers C5, C2 and C6. The closing force produced by spring 26 will, therefore, be sufficient to move the valve assembly to its normally closed condition.

When it is desired to open the valve, a control pressure is applied to control port CP2 (FIG. 8), this usually being the inlet pressure. When pressure is applied to port CP2, an opening force is produced in chambers C3 and C4, which, when added to the opening force produced by the inlet pressure against the upstream face of valve member 21, is sufficient to open the valve.

In all other respects, the normally-closed valve illustrated in FIGS. 9 and 10 may be constructed and operated in substantially the same manner as described above with respect to FIGS. 6–8.

FIG. 11 illustrates a preferred construction that may be used in any of the above-described control valves for the valve member 21 and its annular resilient seal 22 engageable with the conical seat 19 of the inlet coupling duct 13. FIG. 11a illustrates the annular resilient seal in its initial closing position; FIG. 11b illustrates it in its final closing position; and FIG. 11c schematically illustrates how the valve member substantially eliminates the chattering phenomenon.

The annular resilient seal, generally designated 22 in FIG. 11, includes a conical skirt 70 formed with a thickened outer periphery 71 which engages the conical valve seat 19 in the closed condition of the valve assembly. The conical skirt 70 is clamped by a bolt 72 between the conical valve cover 21a on the upstream side, and the valve body 21b on the downstream side bearing against an abutment ring 73, and is of complementary conical configuration as these two parts of valve member 21.

The upstream face of valve body 21b is formed with an annular slot 75 receiving the downstream face of the thickened annular periphery 71 of the resilient seal 22. Slot 75 is of trapezoidal cross-section, being formed with a bottom face 75a substantially parallel to the upstream face of conical valve member 21, and opposed side faces 75b, 75c substantially parallel to the longitudinal axis of the valve assembly 20.

An anchoring member 77 is received within slot 75 and is of complementary configuration to that slot. In addition, it is formed with an annular dovetail rib 76 received within a complementary dovetail groove 78 formed in the downstream face of the thickened annular periphery 71 of the sealing ring 22.

The upstream face of the thickened outer periphery 71 of sealing ring 22 is formed with an outer annular section 79 of tapering thickness, the thickness decreasing in the outward direction. Annular section 79 is defined by an inner annular wall 79a at an obtuse angle to the upstream face of the conical valve member 21, and an outer annular wall 79b at a smaller obtuse angle to the upstream face of the conical valve member 21. The outer face 79c of annular section 79, which comes into sealing contact with the conical valve seat 19, is of a curved configuration.

The outer end of the valve cover 21a terminates at face 79a of the resilient seal 22 and is of complementary configuration to that face. The outer end of the outer annular section 79 of the resilient seal 22, as defined by face 79b, is normally spaced from face 21c at the outer end of the valve body 21b.

As the valve member 21 approaches the conical valve seat 19, face 79c of the resilient seal 22 first engages the conical seat 19 (FIG. 11a), and this section of the resilient seal is deformed against face 21c of valve body 21b in the final closing position (FIG. 11b) of the valve member 12. Thus, as shown in FIG. 11b face 79b of the resilient seal 22 is pressed against face 21c of valve body 21b to produce a firm seal with respect to conical seat 19 in the closed position of the valve.

The construction of the valve seal 22 as illustrated in FIG. 11 has been found to firmly secure the seal 22 to valve member 21 against very high forces tending to unseat the seal from the valve member, particularly in the event of a reverse flow of the fluid through the valve. Also, as shown particularly in FIG. 11c, the outer periphery of seal 22 is sufficiently flexible such that, when the valve is only slightly open, this outer periphery oscillates by the flow, with respect to conical valve seat 19 to effect regulation of the flow. Such a construction has also been found to substantially eliminate chattering as the valve member approaches its final closing position.

The in-line control valve illustrated in FIGS. 12–14 comprise a housing, generally designated 110, having a main cylindrical section 112, an inlet coupling duct 113 at the upstream end, and an outlet coupling duct 114 at the downstream end. The two coupling ducts 113, 114 are of conical configuration and are secured to the main housing section 112 by a pair of threaded coupling rings 115, 116.

Inlet coupling duct 113 includes an inlet port 117, and outlet coupling duct 114 includes an outlet port 118. Inlet coupling duct 113 is formed on its inner surface with a conical valve seat 119 cooperable with the valve member, generally designated 120, for controlling the flow of the fluid from inlet port 117 to outlet port 118.

Valve member 120 is hydrodynamically shaped. It includes a conical valve cover 121 and an annular resilient seal 122 around its outer periphery movable towards and away from conical valve seat 119. Valve member 120 further includes a stem 123 threadedly attached to the downstream face of valve cover 121, and a valve body 124 at the downstream face of the valve cover 121. Valve body 124 is engageable with an abutting ring 125 such that when stem 123 is threadedly attached to valve cover 121, the resilient annular seal 122 is firmly clamped between the valve cover 121 and the valve body 124.

Valve stem 123 extends downstream of valve cover 121 and is received within a cylindrical cavity 126 formed in cap 127 engaging the outlet coupling duct 114 and constituting a rear wall of housing 110.

Valve member 120 further includes a cylindrical skirt 128 integrally formed with valve body 124 and extending downstream of the valve member. Cylindrical skirt 128 is received within a cylindrical slot 129 formed axially in housing 112.

Housing 112 includes a radially-extending wall 130 at the upstream end of cylindrical recess 129. Wall 130 is formed with a central opening for receiving the valve stem 123.

The main housing section 112 is formed with a plurality of radially-extending ribs 112a (FIGS. 13, 14) circumferentially-spaced from each other to define axially-extending passageways 112b (FIG. 15). Cap 127 is similarly formed with a plurality of radially-extending spider arms 127a circumferentially spaced with each other to define passageways 127b. Spider arms 127a of cap 127 are aligned with radial ribs 112a of housing 112 so that the axial passageways 112b through the housing and 127b through the cap are aligned with each other to permit the fluid flow from the inlet port 117 to the outlet port 118 when the valve member 120 is in its open position. The inner surface of the outlet coupling duct 114 is of conical shape, and the outer surface of the spider arms 127b are of complementary conical shape as shown at 127c, so that the spider arms firmly engage the outlet coupling duct 114 just upstream of the outlet port 118.

The illustrated control valve includes the following seals: sealing rings 131 and 132 between the housing 112 and its inlet coupling duct 113 and outlet coupling duct 114, respectively; sealing ring 133 between housing wall 130 and valve stem 123; sealing ring 134 between cap 127 and valve stem 123; sealing ring 135 between cap 127 and housing section 112; and sealing ring 136 between the outer surface of valve skirt 128 and the corresponding surface of housing section 112 formed with slot 129 receiving the valve skirt.

The foregoing seals define the following chambers: (1) control chamber C1 between the downstream face 123a of valve stem 123 and the walls of the cylindrical cavity 126 formed in cap 127; (2) control chamber C2 defined by the downstream face of valve body 124, the inner face of valve skirt 128, the upstream face of housing wall 130, and the portion of valve stem 123 between housing wall 130 and valve body 124 and enclosed by valve skirt 128; (3) control chamber C3 defined by the downstream face 128a of valve skirt 128 and the walls of cylindrical slot 129 formed in housing section 112; and (4) a chamber C4 defined by the inner surface of housing section 112, the downstream face of its radial wall 130, the upstream face of its cap 127, and the outer surface of valve stem 123 between wall 130 and cap 127.

An axial passageway 140 is formed through valve member 120, including its cover 121, valve body 124, and valve stem 123, leading to chamber C1 at the downstream end of the valve stem. The inlet pressure is thus applied via axial passageway 140 to control chamber C1 producing a first force in the direction to move valve member 20 to its closed position.

A radial passageway 141 is formed through valve stem 123 leading from axial passageway 140 to chamber C2. Thus, the inlet pressure applied via axial passageway 140 to chamber C1 is also applied via radial passageway 141 to chamber C2, to produce a second force acting in the same direction as that produced in chamber C1 to move valve member 120 to its closed position.

Chamber C3 is connected to chamber C2 by means of a plurality of longitudinally-extending slots 142 formed in housing section 112 along the inner face of valve skirt 128. Thus, the inlet pressure applied to chamber C2 is also applied via slots 142 to chamber C3 to produce a third force, acting in the same direction as those produced in chambers C1 and C2, to move valve member 120 to its closed position.

Chamber C4 is vented to the atmosphere via a vent 143 formed through one of the ribs 112a in the main housing section 112. Therefore, it does not produce a force applied to the valve member.

Chamber C4, however, includes an actuator for actuating the valve member to either its open position or its closed position. In the example illustrated in FIGS. 12–14, the actuator, generally designated 150, is in the form of an electrical rotary motor formed on its inner surface with thread 151 mating with threads 152 formed on the outer surface of valve stem 123 such that, when motor 150 is rotated, stem 123, and thereby valve member 121, are moved either to the open position or to the closed position, depending on the direction of rotation of the motor.

The valve illustrated in FIGS. 12–14 operates as follows: Assuming the valve member is in its closed position, as illustrated in FIGS. 12 and 13, when the inlet pressure is applied to the inlet duct 117, the inlet pressure will produce an opening force equal to the inlet pressure multiplied by the surface area of the upstream face of valve member 120.

On the other hand, the inlet pressure is also applied (1) via axial passageway 140 to control chamber C1, (2) via radial passageway 141 to control chamber C2, and (3) via slots 142 to control chamber C3. Therefore, a first force will be produced in control chamber C1 equal to the inlet pressure multiplied by the surface area of downstream face 123a of valve stem 123; a second force will be produced in chamber C2 equal to the inlet pressure multiplied by the surface area defined by the inner surface of skirt 128 and the outer surface of valve stem 123; and a third force will be produced in chamber C3 equal to the inlet pressure multiplied by the surface area of downstream face 128a of skirt 128. As can be seen in FIG. 13, for example, the sum of the effective surface areas in chambers C1, C2 and C3, are substantially equal to the surface area at the upstream face of valve member 120, so that the closing forces produced in the three control chambers will be substantially equal to, and will balance, the opening force produced at the inlet face of valve member 120.

Accordingly, the valve will be open and closed only by the operation of the actuator 150. Because of the foregoing balance of forces, the operation of actuator 150 will require relatively little energy to move the valve member 120 either to its closed position (FIGS. 12, 13) or to its open position (FIGS. 14, 15).

FIGS. 16 and 17 illustrate a valve constructed substantially as described above with respect to FIGS. 12–15, and therefore the same reference numerals have been used to identify corresponding parts. The main difference in the valve illustrated in FIGS. 16 and 17 is that, instead of being actuated by an internal electric motor, it is actuated by an external electric motor having a mechanical coupling extending through the valve housing to the valve member.

Thus, as shown in FIGS. 16 and 17, the rotary drive within chamber C4 is in the form of a gear unit 160 having internal threads 161 mating with external threads 162 formed in valve stem 123. Gear 160 is in turn formed with bevel teeth 163 meshing with a bevel gear 164 in chamber C4 and coupled by a drive shaft 165 extending through housing section 112 and driven by an electrical motor 166 externally of the housing. Gear 160 may be further supported for rotation by a rotary bearings 167, 168 between the outer surface of gear 160 and corresponding surfaces of the housing section 112.

In all other respects, the control valve illustrated in FIGS. 16 and 17 is constructed and operates in substantially the same manner as described above with respect to FIGS. 12–15. Thus, as described above, the inlet pressure applied to chambers C1, C2 and C3 all act in the same direction to produce a closing force balancing the opening force produced by the inlet pressure applied to the upstream face of valve member 120, such that little energy is required by the electric motor 166 to move the valve member either to its open position or to its closed position.

While the invention has been described with respect to several preferred embodiments, it will be appreciated that these are set forth merely for purposes of example, and that many variations may be made. For example, the valve seal construction illustrated in FIG. 11 may be used in any one of the in-line valve constructions described herein, but also in other valve constructions. Many other modifications and applications of the invention will be apparent.

What is claimed is:

1. An in-line control valve, comprising:

a housing having an inlet port, an outlet port downstream of the inlet port, and a valve seat between said two ports;

a valve assembly within said housing, said valve assembly including a valve member movable towards and away from said valve seat and having an upstream face facing said valve seat and a downstream face facing the outlet port;

a valve stem fixed to the valve member and extending downstream thereof;

a piston head carried by the valve stem at the downstream end thereof and having a downstream face defining a first control chamber with a first surface of the housing;

a cylindrical skirt fixed to and extending downstream of the valve member and enclosing said valve stem but terminating short of said piston head to define a second control chamber with the valve member, the valve stem and a second surface of said housing;

a fluid flow passageway defined by said housing to permit fluid flow therethrough in the open condition of the valve member;

a pressure-control passageway defined by said valve stem establishing communication between said first and second control chambers such that the fluid pressure in said first chamber acts on the downstream face of the piston head tending to move it and the valve member towards said valve seat, and such that the fluid pressure in said second chamber acts on the downstream face of the valve member and tends to move it and the valve member also towards said valve seat, the upstream face of the piston head and a third surface of the housing defining, a third control chamber such that the fluid pressure therein acts on the upstream face of the piston head tending to move it and the valve member towards the open position of the valve member away from said valve seat; and a control port connected to a source of fluid pressure and communicating with said third control chamber for applying fluid therein to move the valve member towards its open position away from said valve seat.

2. The valve according to claim 1, wherein said valve stem includes: an upstream section defining said second control chamber with said valve member, its cylindrical skirt, and said second surface of the housing; and a downstream section defining said third control chamber with the upstream face of the piston head and said third surface of the housing; said downstream section being of larger outer diameter than said upstream section to produce an annular wall defining a cushioning chamber between said annular wall, the adjacent part of said upstream section, and a fourth surface of said housing, which cushioning chamber is effective to cushion the movement of the valve stem, and thereby of the valve member, to the closing position of the valve member.

3. The valve according to claim 2, wherein said cushioning chamber includes a seal between the outer surface of the valve stem and the housing, and a small-diameter vent opening through the valve stem connecting said cushioning chamber to said control port to vent the fluid within the cushioning chamber via the control port and thereby to cushion the movement of the valve member to its closed position.

4. The valve according to claim 3, wherein said small-diameter vent is a one-way vent permitting fluid flow only in the direction from said cushioning chamber to said control port.

5. The valve according to either of claims 3 or 4, wherein said seal of said cushioning chamber is defined by a sealing ring at a first location on the outer surface of said downstream section of the valve stem, said outer surface being formed with an axially-extending passageway leading from said control port to a second location on the outer surface of said valve stem between said first location and said control port, whereby the cushioning chamber is effective to cushion the valve member only during the final movement thereof to its closed position.

6. The valve according to claim 5, wherein said axially-extending passageway is constituted of a plurality of recesses formed between said third surface of the housing and the outer surface of the downstream section of the valve stem extending axially from said second location to the upstream face of the piston head.

7. The valve according to claim 1, further including a spring acting on the downstream face of the piston head urging the piston head and the valve member towards its closed position.

8. The valve according to claim 7, wherein said spring is interposed between the downstream face of the piston head and a cap engageable with a fifth surface of the housing at said outlet port; said cap being formed with a plurality of fluid passageways therethrough for fluid flow to said outlet port.

9. The valve according to claim 1, wherein said cylindrical skirt of the valve assembly is movable in an annular recess formed axially in the housing, the inner surface of the skirt being sealed with respect to the housing to define said second control chamber, the outer surface of said skirt being unsealed with respect to the housing permitting fluid flow between said skirt and housing in the open position of the valve member.

10. The valve according to claim 9, wherein the diameter of said valve seat is larger than the inner diameter of said skirt but smaller than the outer diameter of said skirt.

11. The valve according to claim 1, wherein the fluid flow passageway through the housing includes a plurality of axially-extending passageways defined by a plurality of radially-extending ribs formed in said housing.

12. The valve according to claims 1, wherein said valve member is normally in its open position by the fluid pressure at said inlet port applied to the upstream face of the valve member, said housing including another control port communicating with said first control chamber for applying fluid pressure therein in a direction to move the valve member to its closed position with respect to said valve seat.

13. The valve according to claim 1, wherein said pressure control passageway establishes communication between the upstream face of the valve member and the downstream face of the piston head such that the fluid pressure at said inlet port is applied also to the piston head in a direction normally to move the valve member to its closed position.

14. The valve according to claim 13, wherein said pressure control passageway establishes communication between the upstream face of the valve member and the downstream face of the outer region of the piston head.

15. The valve according to claim 13, wherein said passenger control passageway establishes communication between the upstream face of the valve member and the downstream face of the central region of the piston head.

16. The valve according to claim 1, wherein said valve seat is of conical configuration increasing in diameter in the downstream direction; said valve member also being of conical configuration and carrying an annular resilient seal engageable with said conical valve seat in the closed position of the valve member.

17. The valve according to claim 16, wherein said valve member includes an upstream valve cover and a downstream valve body, and wherein said annular resilient seal includes a conical skirt clamped between said conical valve cover and valve body, said annular resilient seal further including a thickened outer periphery having an inner section received within an annular recess formed in the outer periphery of said valve body, and an outer section having an annular face exposed by said conical valve cover for sealing engagement with said conical valve seat.

18. The valve according to claim 17, wherein said recess in the valve body includes a dovetail rib receiving and interlocking with a dovetail slot formed in the downstream face of said thickened outer periphery of the annular resilient seal.

19. The valve according to claim 18, wherein said slot in the valve body is inwardly spaced from its outer edge, and said dovetail rib is formed in an anchoring plate received within said slot in the valve body.

20. The valve according to claim 19, wherein said slot includes a bottom face substantially parallel to the upstream face of the conical valve cover, and opposed side faces substantially parallel to the longitudinal axis of the valve assembly.

21. The valve according to any one of claims 17–20, wherein said outer annular section of the annular resilient seal is of a tapering thickness which decreases outwardly thereof and is defined by an inner wall at an obtuse angle to the upstream face of the conical valve cover, and an outer wall at a smaller obtuse angle to the upstream face of the conical valve cover; said conical valve cover terminating at, and being of complementary configuration as, said inner wall of the annular resilient seal.

22. The valve according to claim 21, wherein the outer end of said outer section of the annular resilient seal overlies, and is normally spaced from, an outer surface at the outer end of said valve body but is deformable by the closing pressure into engagement therewith.

23. A control valve, comprising: a housing having an inlet port, an outlet port downstream of the inlet port, and a valve seat between the two ports; and a valve assembly movable within said housing; said valve assembly including a valve member movable towards and away from said valve seat; said valve member having an upstream face facing the valve seat and a downstream face facing the outlet port; said valve seat being of conical configuration increasing in diameter in the downstream direction; said valve member carrying an annular resilient seal engageable with said conical valve seat in the closed position of the valve member; said valve member including an upstream conical valve cover and a downstream valve body of complementary conical configuration; said annular resilient seal including a conical skirt clamped between said conical valve cover and valve body; said annular resilient seal further including a thickened outer periphery having an inner section received within an annular recess formed in the outer periphery of said valve body, and an outer section having an annular face exposed by said conical valve cover for sealing engagement with said conical valve seat.

24. The valve according to, claim 23, wherein said recess in the valve body includes a dovetail rib receiving and interlocking with a dovetail slot formed in the downstream face of said thickened outer periphery of the annular resilient seal.

25. The valve according to claim 24, wherein said slot in the valve body is inwardly spaced from its outer edge, and said dovetail rib is formed in an anchoring plate received within said slot in the valve body.

26. The valve according to claim 25, wherein said slot includes a bottom face substantially parallel to the upstream face of the conical valve cover, and opposed side faces substantially parallel to the longitudinal axis of the valve assembly.

27. The valve according to any one of claims 23–26, wherein said outer annular section of the annular resilient seal is of a tapering thickness which decreases outwardly thereof and is defined by an inner wall at an obtuse angle to the upstream face of the conical valve cover, and an outer wall at a smaller obtuse angle to the upstream face of the conical valve cover; said conical valve cover terminating at, and being of complementary configuration as, said inner wall of the annular resilient seal.

28. The valve according to claim 27, wherein the outer end of said outer section of the annular resilient seal overlies, and is normally spaced from, an outer surface at the outer end of said valve body but is deformable by the closing pressure into engagement therewith.

* * * * *